US009944549B1

(12) United States Patent
Rowland

(10) Patent No.: US 9,944,549 B1
(45) Date of Patent: Apr. 17, 2018

(54) DE-WATERING MACHINE

(71) Applicant: Jonathan Rowland, Louisville, KY (US)

(72) Inventor: Jonathan Rowland, Louisville, KY (US)

(*) Notice: Subject to any disclaimer, the term of this patent is extended or adjusted under 35 U.S.C. 154(b) by 403 days.

(21) Appl. No.: 14/054,246

(22) Filed: Oct. 15, 2013

Related U.S. Application Data

(60) Provisional application No. 61/714,740, filed on Oct. 16, 2012.

(51) Int. Cl.
C02F 11/12 (2006.01)

(52) U.S. Cl.
CPC .................. C02F 11/123 (2013.01)

(58) Field of Classification Search
CPC ............ B01D 29/0077; B01D 29/0084; B01D 46/36; B01D 46/185; B01D 46/16; B01D 33/056; B01D 33/0058; B01D 33/048; B01D 33/04; B01D 25/121; C02F 11/123
USPC ....................................................... 210/108
See application file for complete search history.

(56) References Cited

U.S. PATENT DOCUMENTS

| 3,645,399 A * | 2/1972 | Kalman ............. B01D 29/0015 210/184 |
| 4,137,169 A | 1/1979 | El-Hindi |
| 4,147,635 A * | 4/1979 | Crowe ............... B01D 29/0015 210/401 |
| 4,154,686 A | 5/1979 | Ootani et al. |
| 4,880,538 A | 11/1989 | Barcomb et al. |
| 5,456,832 A * | 10/1995 | Louden ............... B01D 33/042 100/118 |
| 6,622,870 B1 | 9/2003 | Prinssen |
| 7,334,688 B2 | 2/2008 | Pahl et al. |

OTHER PUBLICATIONS

Water/Wastewater Distance Learning Website, "Dewatering", http://water.me.vccs.edu/courses/ENV149/dewateringb.htm, Jan. 26, 2004.*

* cited by examiner

Primary Examiner — Chester Barry
(74) Attorney, Agent, or Firm — John D Ritchison; Ritchison Law Offices, PC

(57) ABSTRACT

A dewatering device comprised of a multiple drum and conveyor system, the device has two or more roller drums about which an endless supporting belt is located to provide a movable supporting area between the rollers. The belt supports a filter medium which also passes about the rollers. The belt has a number of apertures allowing passage of liquid through the filter medium and below the belt. The belt is also formed with a series of transverse troughs which help guide the mixture toward the apertures situated in the troughs. A vacuum chamber (i.e. a "suction box") is placed under the belt between the rollers and forms a pressure gradient through the cloth and belt to suck the liquid from the mixture via the cloth and apertures.

9 Claims, 23 Drawing Sheets

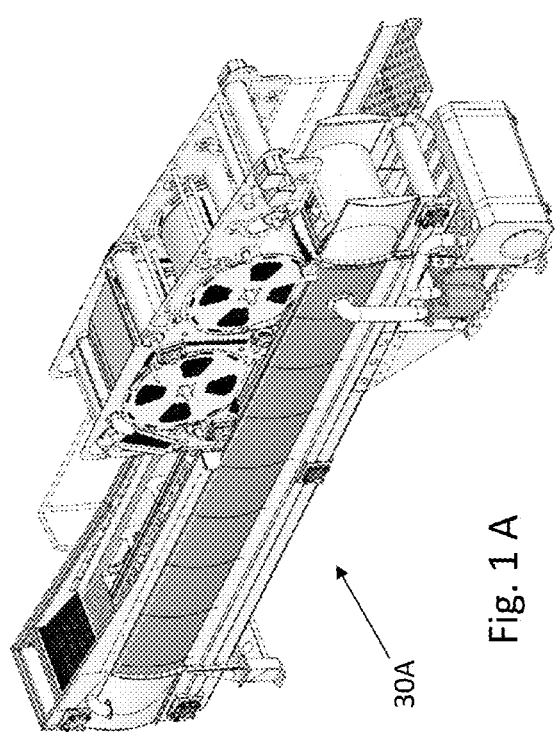
Fig. 1A
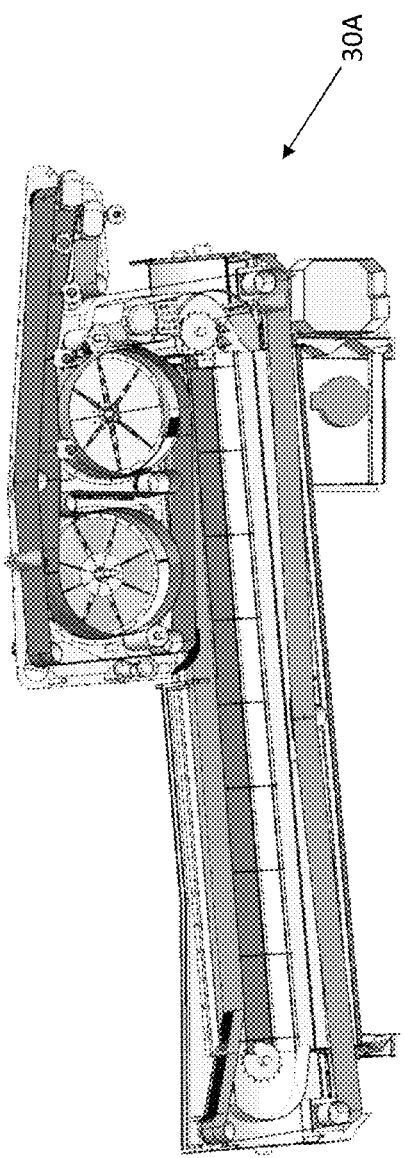
Fig. 1B
Figs. 1

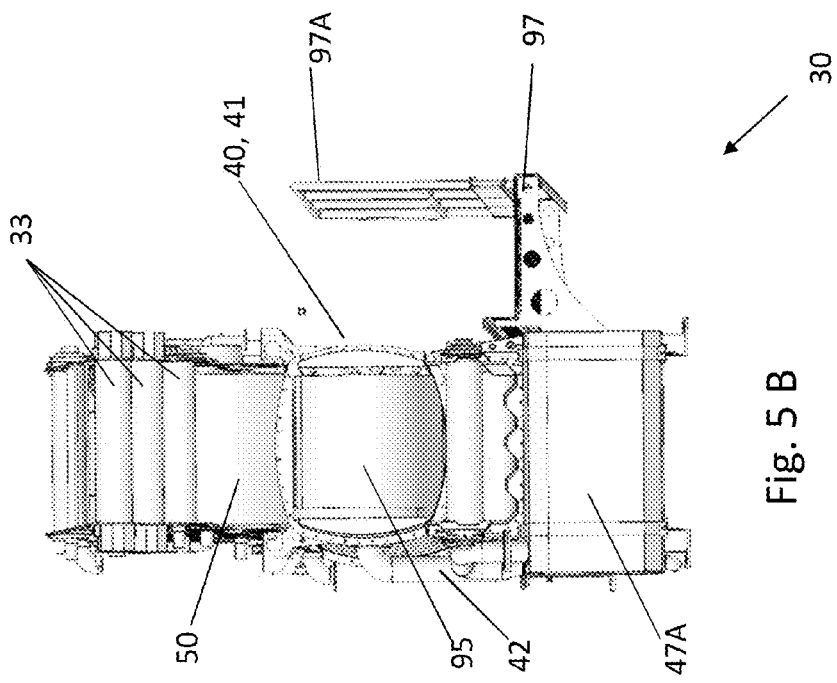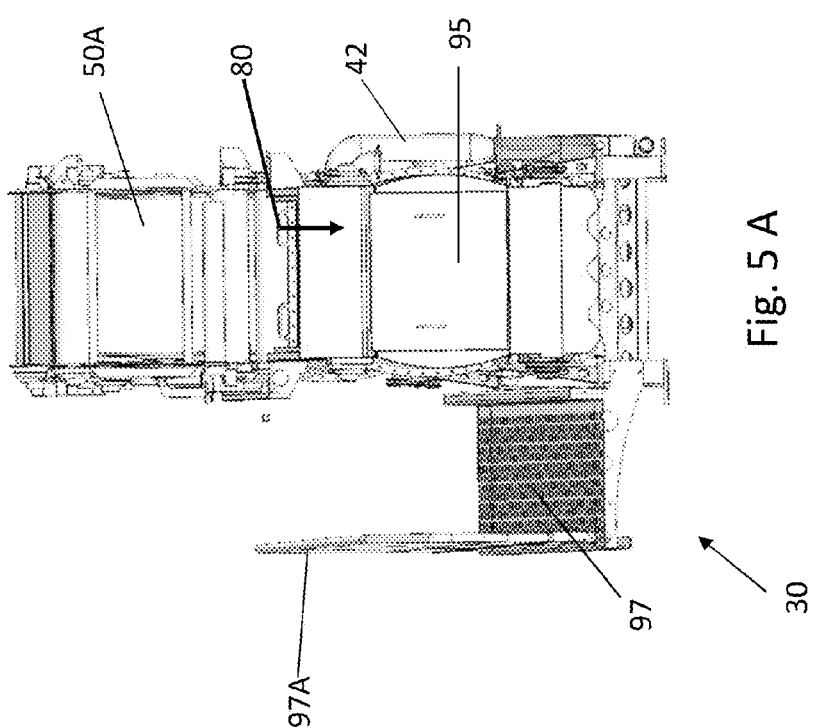
Figs. 5

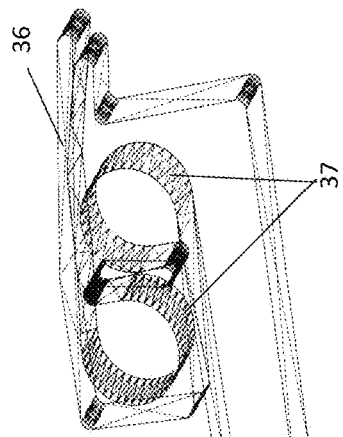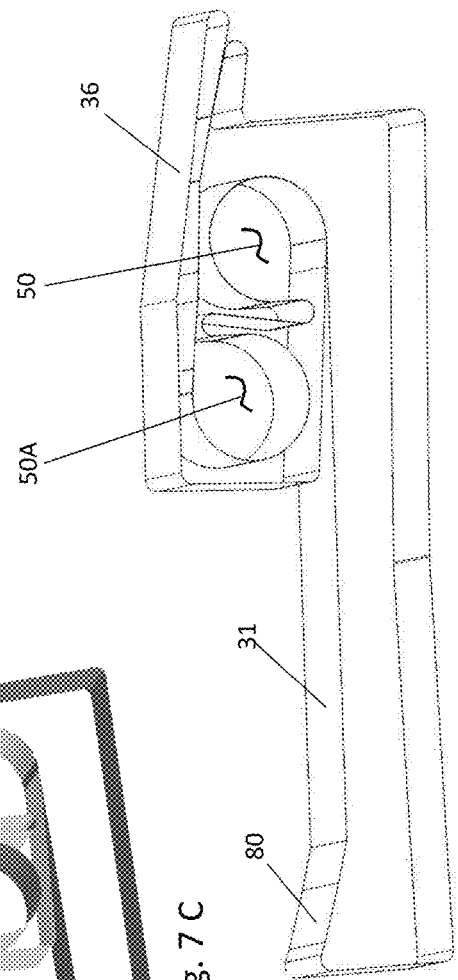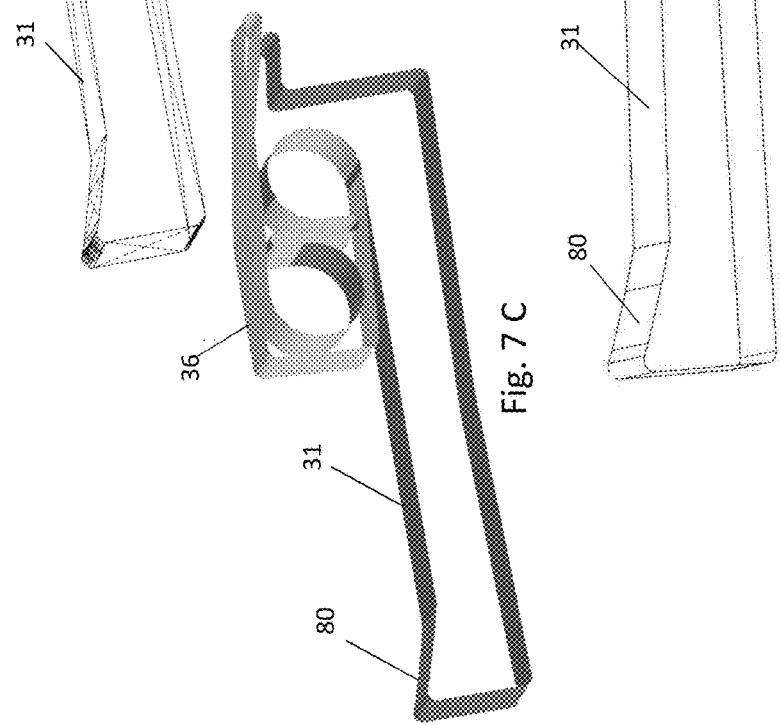
Figs. 7

Section View

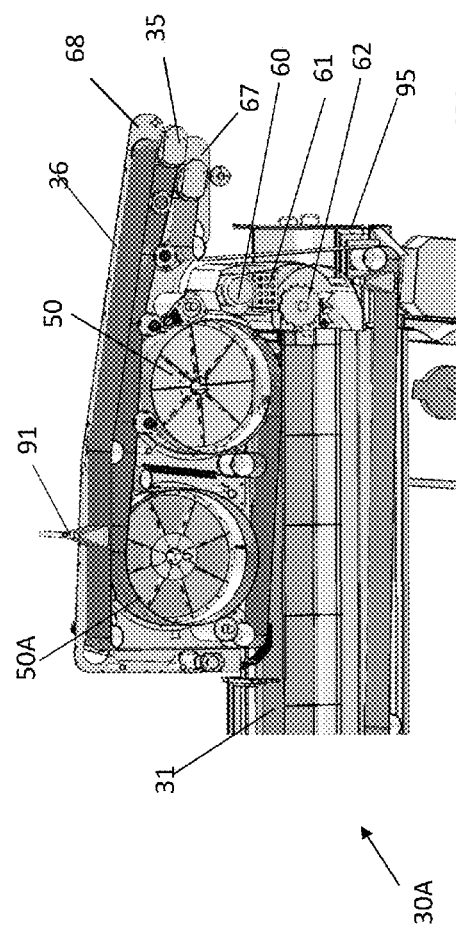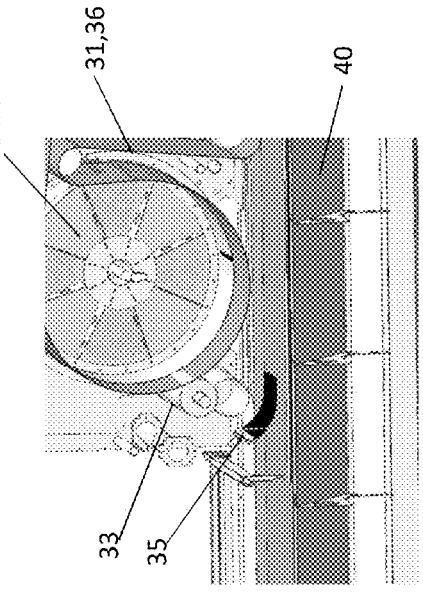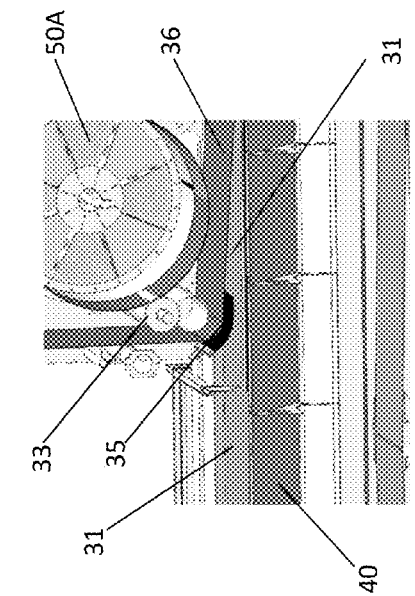
Figs. 10

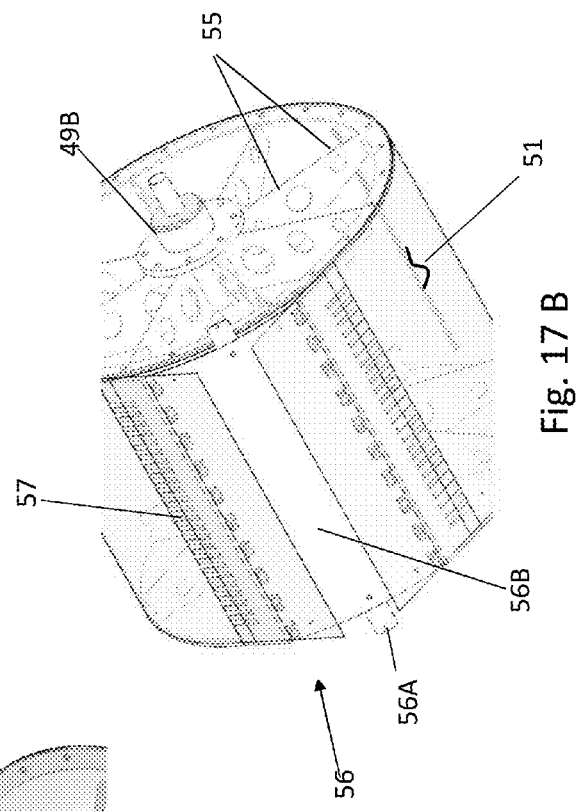
Fig. 17 B
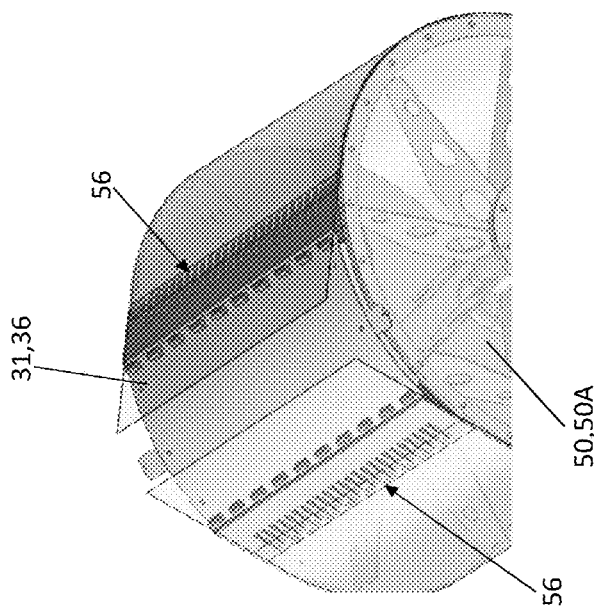
Fig. 17 A
Figs. 17

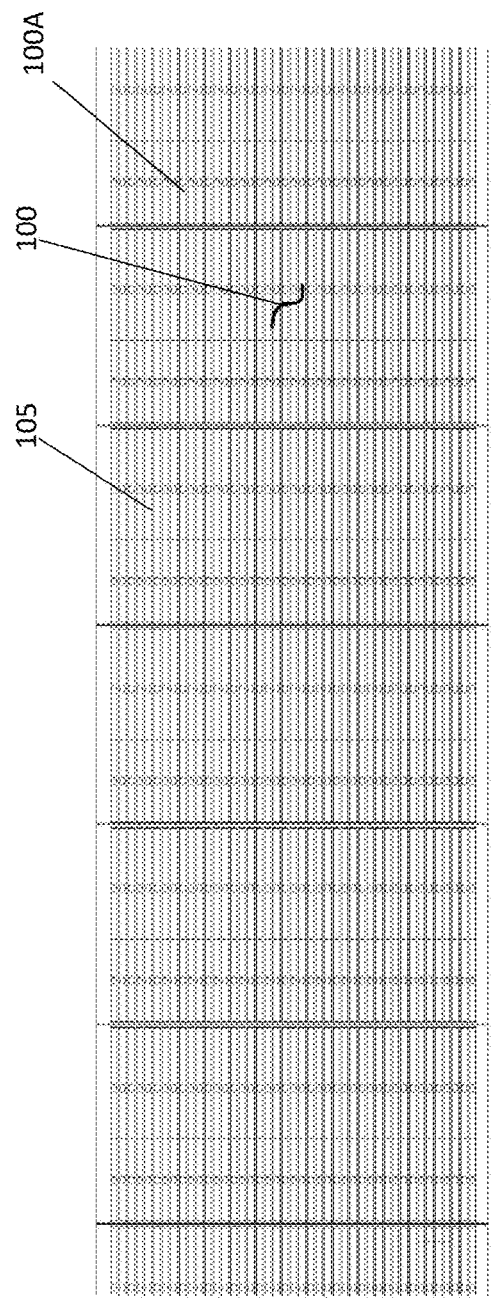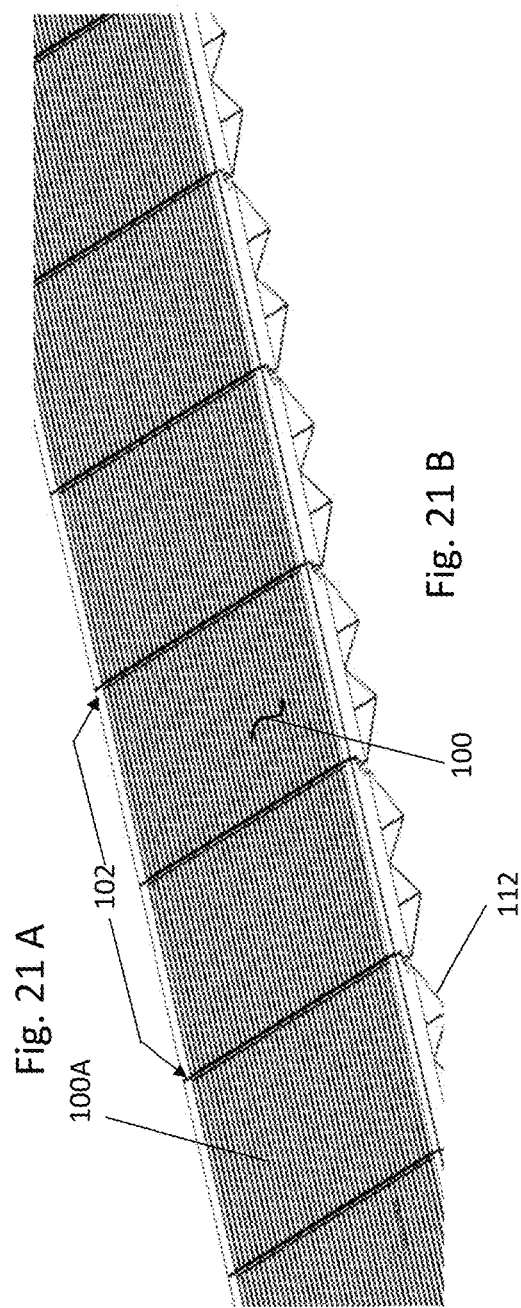
Fig. 21 A
Fig. 21 B

DE-WATERING MACHINE

CROSS-REFERENCE TO RELATED APPLICATIONS

This application claims the benefit of Provisional Patent Application Ser. No. 61/714,740 filed Oct. 16, 2012 by Jonathan Rowland and entitled "Special dewatering machine called ecoFlex".

FIELD OF INVENTION

This invention relates to a device and a process for mechanically dewatering slurries. Further, this invention relates to a liquid removal apparatus, and in particular, but not exclusively, to a dewatering apparatus for use in removing a significant proportion of the water from a sludge or slurry composed of liquids and solids.

The slurries treated by this device and process may be among many types including, for example and not as a limitation, fibrous organic waste such as municipal wastewater sewage sludge; industrial wastes as fibrous and liquid mixtures; animal wastes associated with farming, concentrated animal feeding operations (CAFOs), and other agricultural uses; coal, waste coal and coal fine recovery sites; biomass energy products such as corn ethanol plants; distilleries and breweries; and other industrial markets.

FEDERALLY SPONSORED RESEARCH

None.

SEQUENCE LISTING OR PROGRAM

None.

BACKGROUND—FIELD OF INVENTION AND PRIOR ART

It is believed that this product is unique in its design and technologies. For any discussions of prior art and references herein, the applicant reserves the right to challenge the accuracy and pertinence of any cited documents. It will be shown that any discussion of a reference does not constitute an admission that any of the documents form part of the common general knowledge in the prior art.

There are many applications where it is necessary to remove a liquid from a mixture of solids and liquids. The solids are typically suspended in the liquid. However, in low liquid concentrations, the liquid may be bound and connected to the solids (e.g., absorbed by the solids). One such method of solid-liquid separation is to deposit the mixture in settling ponds where the suspended solids settle into defined layers over time depending on their density relative to the liquid. Sewerage treatment facilities and CAFOs often use such a system. Prior to processing, the solids from these mixtures, the water content must be significantly reduced, e.g., from around eighty percent by weight to less than twenty percent. The slurry is thus transformed into a lower volume, damp, semi-solid sludge that is easier to handle and lighter to transport, or which can be more easily processed.

There are many other existing techniques for removing liquid from a solid-liquid mixture. The following examples are typical of the prior art: Evaporation or Heat Extraction—in this type of process the mixture is heated to evaporate the liquid from the solids. The evaporated liquid is then condensed and recycled. Centrifugal—in this type of process the mixture can also be placed in a centrifuge chamber with a liquid-permeable filtrate about a periphery thereof. On activation of the centrifuge, the liquid thus passes through the filtrate and the solids can then be removed from the chamber. Compression—in this type of process the mixture may be compacted by being passed between two conveyor belts with a constricting space there between, the liquid being forced from the solid. Filtration—in this type of process the mixture may be passed over a filtrate medium or grating that is liquid-permeable so as to allow the liquid to drain from the mixture. It will be clear that each of the aforementioned methods have attendant advantages and disadvantages in processing different mixture-types. For example, compression techniques may not be suitable for mixtures with a low solids concentration and a centrifugal method may not be suitable where the solids are sharp and abrasive.

PRIOR ART REFERENCES

Known types of such vacuum filtrate systems are described in U.S. Pat. Nos. 4,137,169 and 4,880,538 by El Hindi, U.S. Pat. No. 4,154,686 by Ootani et al., U.S. Pat. No. 7,334,688 by Pahl et al. U.S. Pat. No. 6,622,870 by Prinssen and U.S. Pat. No. 4,147,635 by Crowe. Similar systems are also described in Canadian Patent No. 991094 by van Oosten and PCT publication No. WO2001/097948 by Marchal. French patent No. 2,787,035 by Benacchio describes another vacuum filtrate system.

El Hindi has a U.S. Pat. No. 4,137,169 issued in 1979 and entitled "Liquid Filtration System". It teaches a liquid filtration system for separating contaminants from liquids such as coolants used in machining operations. The invention provides the following: (a) filtration apparatus wherein the invention is concerned with filtration apparatus employing parallel endless chains with transverse flights which support and transport a strip of filter material and a means for scavenging liquid from the filter cake of contaminants which collect on the surface of a movable filter element. Another El Hindi has a U.S. Pat. No. 4,880,538 issued to Barcomb, et al in 1989 and entitled "Edge seal for liquid filtration apparatus". This patent teaches a labyrinth seal incorporated in liquid filtration apparatus to prevent migration of unfiltered liquid carrying solid contaminants and air which may be entrapped in such liquid past the lateral edges of a filter media carried on an endless conveyor into an underlying chamber for receiving filtered liquid. The seal includes a pair of low friction strips and an underlying seal support fixedly attached in superposed relation along both interior sides of the tank and extending between positions where the conveyor enters and exits the unfiltered liquid.

U.S. Pat. No. 4,154,686 issued to Ootani (1979) and entitled "Apparatus for continuous liquid-solid separation" shows an apparatus for continuous liquid-solid separation that has suction boxes which respectively have a suction hole on a rear surface and a perforated surface at a front surface and said suction boxes being connected in series to form a conveyor and said suction holes being connected to a suction trough so as to give the sucking condition of the suction boxes in the zone of the suction trough wherein a filter cloth is contacted with the perforated surfaces of the suction boxes and is held by side plates which can be closed and opened at both sides of the suction boxes and the filter cloth and the suction boxes are moved at the synchronized velocity under suction. U.S. Pat. No. 7,334,688 issued to Pahl et al. (2008) and entitled "Filtration system and seal assembly" demonstrates a filtration system that includes a filter medium that has two side edges. The filter medium is moveable in a longitudinal direction, and at least a segment of the filter medium is used to filter a fluid. Seals are used to seal the filter medium segment's side edges, and the seals are moveable with the filter medium in the longitudinal direction.

U.S. Pat. No. 6,622,870 issued to Prinssen (2003) and entitled "Vacuum belt filter apparatus enclosed in a pressurized chamber and related method of filtration" shows a filtering device for separating liquid and solid material from a mixture that consists of an endless filter belt. Filtrate is separated off by means of the pressure difference above and below the filter belt. The device is placed in a high pressure space in order to keep liquid substances which at ambient temperature and atmospheric pressure would become gaseous. The applied pressures can rise to roughly 20 bar. Next, U.S. Pat. No. 4,147,635 issued to Crowe (1979) and entitled "Filter apparatus" demonstrates a filter apparatus wherein filter media that is submerged in liquid being filtered and suction is employed under the media to increase the flow through it. The filter media in elongated strip form is supported for movement in one direction on an inclined endless pervious conveyor comprised of rigid plate members fixed to a pair of drive chains. A receiving tank for dirty liquid is above the conveyor and media with a lower tank for clean liquid below the conveyor with the sides and ends of the lower tank being constantly sealed in order to maintain reduced pressure therein to enhance flow through the media. Filtered liquid at a somewhat higher pressure is supplied at the sides of the conveyor and at end walls of the receiving tank to prevent any migration of dirty liquid into the lower tank at the periphery of the lower tank.

Other apparatuses for consideration include foreign Canadian Patent No. 991094 issued to van Oosten; World application PCT publication No. WO2001/097948 by Marchal; and French patent No. 2,787,035 issued to Benacchio.

The above described devices are all similar to each other as systems that generally comprise a conveyor system onto which the mixture to be filtered is deposited. The new Rowland drum and conveyor system has two or more roller drums about which an endless supporting belt is located to provide a movable supporting area between the rollers. The belt supports a filter medium which also passes about the rollers. The belt has a number of apertures allowing passage of liquid through the filter medium and below the belt. The belt is also formed with a series of transverse troughs which help guide the mixture toward the apertures situated in the troughs. A vacuum chamber (i.e. a "suction box") is placed under the belt between the rollers and forms a pressure gradient through the cloth and belt to suck the liquid from the mixture via the cloth and apertures. The vacuum chamber of Prinssen, Thissen and Marchal systems are each configured to reciprocate between the rollers to move with the belt in order to maximize the time of suction in each cycle. The Thissen and Prinssen devices also use a compression chamber on the opposing side of the cloth to the vacuum in order to provide a greater pressure gradient, or in the Prinssen system, pressurize the entire apparatus to prevent gasification of mixture components. Thus, these all fail to anticipate or obviate the Rowland technology and art.

While such prior art systems may be effective at achieving a high reduction in water content in most applications, prior art and the industry teaches that there are a number of inherent disadvantages in using such complex systems, as described below. Belt-based systems such as the Thissen, Prinssen and Marchal systems can prove expensive as the supporting rubber belts used often need replacing as they become stretched or damaged under the large stresses caused by the vacuum and weight of the mixture. Replacing belts can prove costly in terms of materials and operational delay. Moreover, such systems typically only apply the vacuum via the apertures in the belts, which can be small or narrow, thus potentially not evacuating liquid evenly through the filter medium. Further, it is taught that the vacuum chamber is inherently more difficult to seal against the mesh screen of the El-Hindi systems and thus requires a complicated sealing mechanism in order to function properly. Such sealing mechanisms are described in U.S. Pat. No. 4,880,538 by El-Hindi, U.S. Pat. No. 4,147,635 by Crowe and U.S. Pat. No. 7,334,688 by Pahl et al.

It is therefore an object of the present invention to provide a liquid removal apparatus which will overcome the above-mentioned problems, and provide the public with a useful improved device and process for liquid removal from slurries. However, as far as known, there are no other special dewatering machines called ecoFlex as devices or processes.

SUMMARY OF THE INVENTION

This invention is a special dewatering machine called ecoFlex. The invention is directly concerned with a dewatering process using multiple supported conveyor belts, pressurized drums and a full presence of a vacuum system wherein the liquid removed from the slurry is quickly and continuously removed through a pressure surface of the material handling belts. The present invention is directed to a continuous, material handling and dewatering system that employs a series of vacuum devices and gravity separation devices. It may be used with flocculation and other waste removal devices and processes.

The preferred embodiment of a dewatering machine called ecoFlex is comprised of:
a. a bottom material handling belt with an open surface configuration and supported by a movable tray system on a specific path within the dewatering machine; b. a top material handling belt with an open surface configuration and on a specific path within the dewatering machine; c. an intersection point where the bottom and top material handling belts closely pass each other and are quasi contiguous; d. at least one drum which is part of the dewatering machine path; e. a means for moving the top and bottom material handling belts through the dewatering machine; f. a means for each of the top and the bottom material handling belts for keeping the bottom and top belt constantly in tension; g. at least one vacuum system connected with an enclosure of the top and bottom material handling belts and with the at least one drum; h. a scraper means for removing a dryer slurry cake from the top and bottom material handling belts; i. a means for cleaning each of the top and bottom material handling belt; j. a means for diverting the wastewater to a collection system; and k. a means for returning and for directional controlling the bottom material handling belt wherein a slurry composed of a mixture of suspended solids, fiber and liquid may be loaded onto the bottom belt and be processed with the top and bottom material handling belts compression and the vacuum chambers along the top and bottom material handling belts and through large drums in order to remove and separate the liquid from the solids and fiber in the mixture and result in a dewatered, nearly dry cake material for further treatment or disposal.

OBJECTS AND ADVANTAGES

There are several objects and advantages of the special dewatering machine called ecoFlex. There are currently no known dewatering systems and processes that are effective at providing the objects of this invention. The new dewatering system was based on several objectives. A new waste separator was configured and developed that:
1. can withstand various levels of vacuum;
2. allows one to attain full control of water flows inside while in operation;
3. has a carrier system that stays free from water at all times through the cycle;
4. has a support deck that can support large masses such as 25 tons;
5. can pump the water the filtrate water out while under full vacuum;
6. can be easily scaled up to larger sizes;
7. can be used with or without a polymer in the waste product;
8. can be used as a stand-alone, pre-, or post filter device; in the solid separation process;
9. can be outfitted with or without vacuum press rollers, depending on dry solids content;
10. handles more water, has a quicker release and smaller footprint due to the pressure dome;
11. operates with much lower power consumption than competing technologies;
12. recovers easily all gases for electrical generation;
13. is designed so very little maintenance is required;
14. needs only minimal modifications to be used in a waste water back wash system; and
15. uses less energy because the inner support deck is frictionless.

It is believed that all of the above goals have been met.

Finally, other advantages and additional features of the present special dewatering machine called ecoFlex and its process of dewatering will be more apparent from the accompanying drawings and from the full description of the device. For one skilled in the art of dewatering devices, systems, and processes, it is readily understood that the features shown in the examples with this product are readily adapted to other types of dewatering and slurry treatment systems and devices.

BRIEF DESCRIPTION OF THE SEVERAL VIEWS OF THE DRAWINGS

The accompanying drawings, which are incorporated in and constitute a part of this specification, illustrate an embodiment of the special dewatering machine called ecoFlex device that is preferred. The drawings, together with the summary description given above and a detailed description given below, serve to explain the principles of the special dewatering machine called ecoFlex for various waste treatment applications. It is understood, however, that the dewatering machine is not limited to only the precise arrangements and instrumentalities shown.

FIGS. 1 A and 1 B are sketches of the special dewatering machine called ecoFlex, with a vacuum and belt combination.

FIGS. 5 A and 5 B are sketches of the special dewatering machine called ecoFlex, with a vacuum and belt combination from a front and rear view.

FIGS. 7 A through 7 C are sketches of the belt combinations for the special dewatering machine called ecoFlex, with a vacuum and belt combinations from several views.

FIGS. 10 A through 10 C are sketches of the ecoFlex machine just ahead of the top belt engagement showing the wiper mechanism.

FIGS. 17 A and 17 B are more sketches and descriptions for the vacuum drum transition seal and belt transition mechanism.

FIGS. 21 A and 21 B are sketches of the belt support trays and details shown from a top view.

Figure 2:
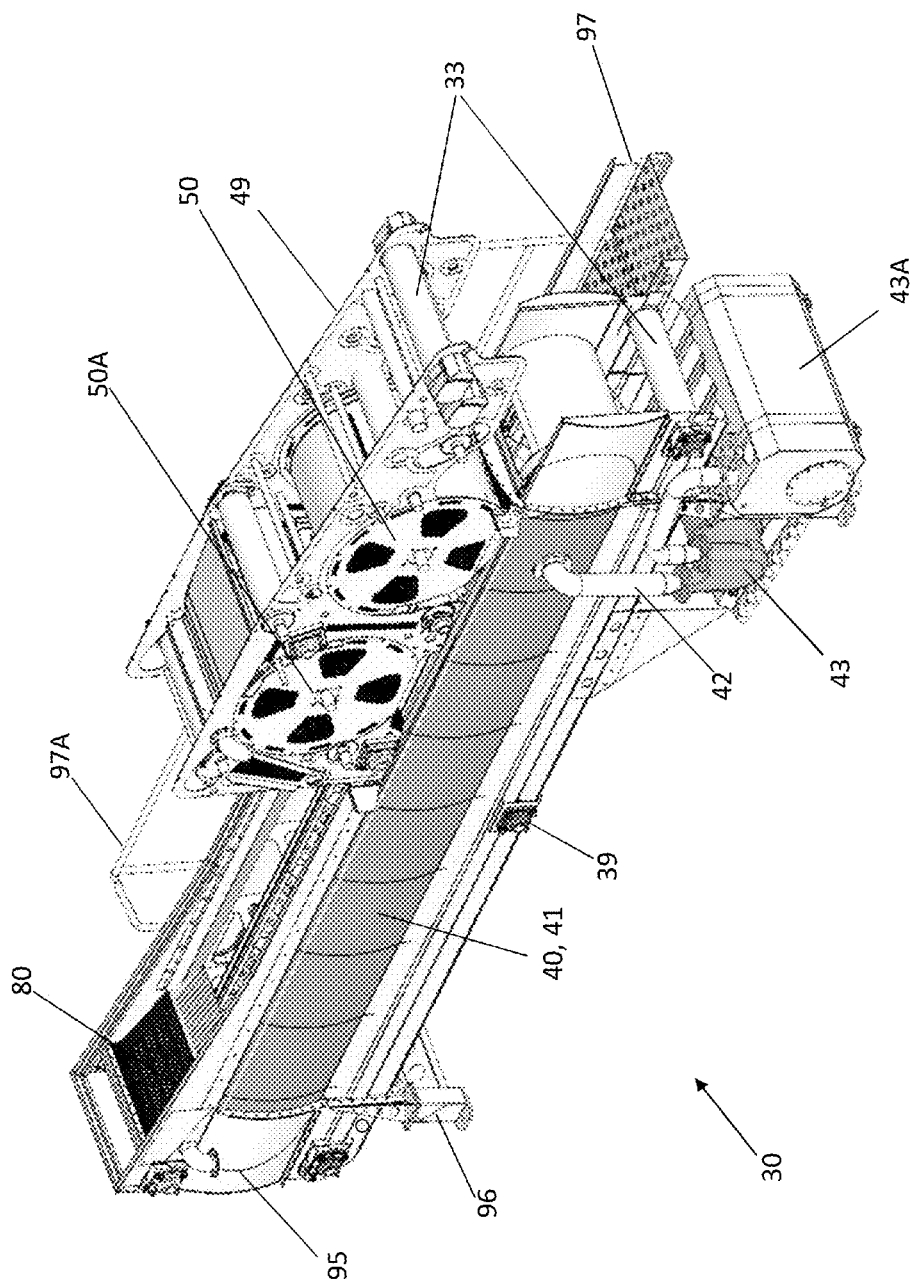
FIG. 2 is a sketch of the special dewatering machine called ecoFlex, with a vacuum and belt combination with components and features noted from a side and isometric view.

The following list refers to the drawings:

TABLE B

Reference numbers

| Ref # | Description |
|---|---|
| 30 | special dewatering combination vacuum and pressured belt machine, full dewatering assembly |
| 30A | center section view of dewatering machine |
| 31 | bottom/lower belt |
| 32 | bottom/lower belt membrane |
| 33 | belt rollers |
| 34 | sophisticated parallel belt tensioner (bottom/lower) |
| 34A | sophisticated parallel belt tensioner (top/upper) |
| 34P | sketch of tensioner |
| 35 | belt scraper(s) bottom/lower and top/upper |
| 35A | pre drum wiper flap |
| 36 | top belt |
| 37 | belt wraps and drums |
| 38 | crush/pressure roller |
| 39 | tracking roller mechanism |
| 40 | vacuum chamber (lower) |
| 41 | guards and enclosures all around for creating vacuum chamber |
| 42 | connector pipes from chamber to drum |
| 43 | vacuum pump(s) |
| 43A | vacuum tank |
| 44 | regulator for pump(s) or liner |
| 45 | motor for vacuum pump |
| 46 | means to connect vacuum pump to motor drum |
| 47 | means to connect vacuum line to lose vacuum chamber |
| 48 | means to connect vacuum line to drums |
| 49 | structure on holding drums |
| 49A | drum bearings |
| 49B | bushings and shaft |
| 49P | structure holding drums sketch |
| 50 | vacuum drums 1 |
| 50A | vacuum drum 2 |
| 51 | cylindrical surfaces of drums |
| 50B | other drum |
| 52 | apertures/holes in drum surfaces |
| 53 | solid area of surface at end of drum |
| 54 | end of drum |
| 55 | support sides of drum |
| 56 | vacuum drum transition seal assembly |
| 56B | solid Curved Plate |
| 56A | mount tabs |
| 57 | comb tapered transitions |
| 57A | comb fingers |
| 58 | piston channel |
| 58A | medium to soft durometer rubber-like seal along toes of piston channel sealing any irregular drum surface |
| 59 | water opening to piston channel |
| 60 | motor |
| 60A | motor to gearbox connection means |
| 61 | gearbox |
| 62 | drive sprocket from motor to tray drive shaft |
| 62A | means to connect gearbox to drive sprocket |
| 62B | drive sprocket and shaft to drive chain for bottom/lower belt trays |
| 63 | power to motor |
| 64 | power to vacuum |
| 65 | machine control and electrical box |
| 66 | front/lead sprocket to drive bottom/lower belt |
| 67 | front/lead pulley for bottom/lower belt |
| 68 | front/lead pulley for top/upper belt |
| 69 | means to connect gear boxes to drive pulley |
| 70 | bottom/lower return tray below lower belt |
| 80 | in feed part where slurry is loaded to belt |
| 81 | back scraper at in feed |
| 82 | water level |
| 83 | initial scraper to spread/paste material |
| 84 | pre-coat |
| 85 | slurry of waste material - solids & liquids - debris |
| 86 | filtrate liquids and water without significant solids |
| 87 | solids - fiber, inert, organic, inorganic, sand, etc. |
| 88 | paste/wet cake |
| 89 | dry cake |
| 89A | out feed material (after scraper) |

TABLE B-continued

Reference numbers

| Ref # | Description |
|---|---|
| 90 | water lines to belt washers, pistons, etc. |
| 91 | belt washer sprayers and flow control |
| 92 | liquids/water drain pipe |
| 93 | sump and pump to remove excess water (not shown) |
| 94 | vacuum/air |
| 95 | machine enclosure |
| 96 | machine structural member |
| 97 | work platform |
| 97A | platform guardrail |
| 100 | tray |
| 100A | top tray surface |
| 101 | tray sub-assembly/deck |
| 101A | offset interconnect |
| 101P | tray sub-assembly sketch |
| 102 | multiple trays - deck |
| 103 | tray bearing and roller |
| 104 | chain link |
| 105 | protrusions above top tray 100A |
| 106 | wear and seal strap along tray |
| 106A | wear strip holder |
| 107 | inverted "vee" plates below tray |
| 108 | gussets below "vees" |
| 109 | channels under chain rollers |
| 110 | 2 belt end seal plates at Point EE |
| 111 | side seal plates at Point EE |
| Point AA | initial in-feed of material |
| Point BB | transition into vacuum zone |
| Point CC | scrape ahead of vacuum drums |
| Point DD | top belt intersection with bottom/lower belt and cake material of original slurry (the bottom and top material handling belts closely pass each other and are quasi contiguous) |
| Point EE | upward turn of belts and cake around initial vacuum drum |
| Point FF | initial reverse roller at 8:00 off $1^{st}$ drum to upward vertical |
| Point GG | transition to next ($2^{nd}$) drum |
| Point HH | top of $2^{nd}$ drum transition off |
| Point II | exit/cake scrapers and out feed |
| Point JJ | sophisticated parallel belt tensioners |
| Point KK | lower turn into belt washers |
| Point LL | mid machine belt tracker |
| Point MM | last roller vertical to beginning |

DETAILED DESCRIPTION OF PREFERRED EMBODIMENT

The present invention is a special dewatering machine called ecoFlex device and process. This invention relates to a device and a process for mechanically dewatering slurries. Further, this invention relates to a liquid removal apparatus, and in particular, but not exclusively, to a dewatering apparatus for use in removing a significant proportion of the water from a sludge or slurry composed of liquids and solids.

Presented here are ways in which a dewatering machine and process may be conducted by using multiple supported conveyor belts, pressurized drums, and a full presence of a vacuum system wherein the liquid removed from the slurry is quickly and continuously removed through a pressure surface of the material handling belts. The present invention is directed to a continuous, material handling and dewatering system that employs a series of vacuum devices and gravity separation devices.

The objects and advantages for the special dewatering machine called ecoFlex device and process are listed above in the paragraphs of the introduction.

The preferred embodiment of a dewatering machine called ecoFlex is comprised of:

a. a bottom material handling belt with an open surface configuration and supported by a movable tray system on a specific path within the dewatering machine; b. a top material handling belt with an open surface configuration and on a specific path within the dewatering machine; c. an intersection point where the bottom and top material handling belts closely pass each other and are quasi contiguous; d. at least one drum which is part of the dewatering machine path; e. a means for moving the top and bottom material handling belts through the dewatering machine; f. a means for each of the top and the bottom material handling belts for keeping the bottom and top belt constantly in tension; g. at least one vacuum system connected with an enclosure of the top and bottom material handling belts and with the at least one drum; h. a scraper means for removing a dryer slurry cake from the top and bottom material handling belts; i. a means for cleaning each of the top and bottom material handling belt; j. a means for diverting the wastewater to a collection system; and k. a means for returning and for directional controlling the bottom material handling belt wherein a slurry composed of a mixture of suspended solids, fiber and liquid may be loaded onto the bottom belt and be processed with the top and bottom material handling belts compression and the vacuum chambers along the top and bottom material handling belts and through large drums in order to remove and separate the liquid from the solids and fiber in the mixture and result in a dewatered, nearly dry cake material for further treatment or disposal.

There are shown in FIGS. 1-23 a complete description and operative embodiment of the special dewatering machine called ecoFlex device and process. In the drawings and illustrations, one notes well that the FIGS. 1-23 demonstrate the general configuration and use of this product and method. The various example uses are in the operation and use section, below.

The accompanying drawings, which are incorporated in and constitute a part of this specification, illustrate an embodiment of the special dewatering machine called ecoFlex device and process 30 that is preferred. The drawings together with the summary description given above and a detailed description given below serve to explain the principles of the special dewatering machine called ecoFlex device and process 30. It is understood, however, that the special dewatering machine called ecoFlex device and process 30 is not limited to only the precise arrangements and instrumentalities shown. Other examples of dewatering devices and methods are still understood by one skilled in the art of dewatering slurries and the like to be within the scope and spirit shown here.

FIGS. 1 A and 1 B are sketches of the special dewatering machine 30 called ecoFlex, with a vacuum and belt combination. The unique and novel manner in which combinations of components and features are accomplished provide an effective and efficient dewatering machine 30 and process. The details and complete best mode of the embodiment and alternative embodiments are described in the paragraphs below.

FIG. 2 is a sketch of the special dewatering machine 30 called ecoFlex, with a vacuum and belt combination with components and features noted from a side and isometric view. Starting at the in feed point 80 where the slurry 85 of [waste] material—solids, suspended solids, fibers and liquids etc. are loaded onto the bottom/lower belt 31 (not shown in this view to enable viewing other components). One notes the machine enclosure 95 that helps to protect the conveyor. Also shown is a typical part of the machine structural members 96 [here a vertical leg member]. Further toward the center of the dewatering machine 30 between the in feed 80 and the drum structures 50, 50A are the vacuum chamber 40, its enclosures 41, and the belt tracking mechanism 39. Along the side(s) of the entire machine 30 are a guard rail 97A and work platform 97. This platform 97 may be placed on either or both longitudinal sides of the machine 30, or—if preferred—omitted entirely. In the center of the machine 30 is viewed the large drums 50, 50A which will be further described below. These drums 50, 50A serve to provide wraps for the bottom/lower belts 31 and top belt 36 as they progress throughout the machine 30 as well as the drums 50, 50A serve as another vacuum device to remove liquid 86 from the slurry 85. These drums 50, 50A are supported along their sides by structure 49 for holding the drums. At the opposite end of the in feed 80 is the out feed scrapers 89A (not shown) and belt rollers 33. At the out feed end [Point II in other views] is where the vacuum pump 43 and vacuum tank 43A are located in this configuration. One skilled in the art of machinery well understands the vacuum tank 43A and pump 43 may be located at other places without impacting the scope and spirit of this dewatering machine 30 invention. From the pump and tank is the connection piping 42 to interconnect the vacuum source 43 with the drums 50, 50A and vacuum chamber 40.

Figure 3:
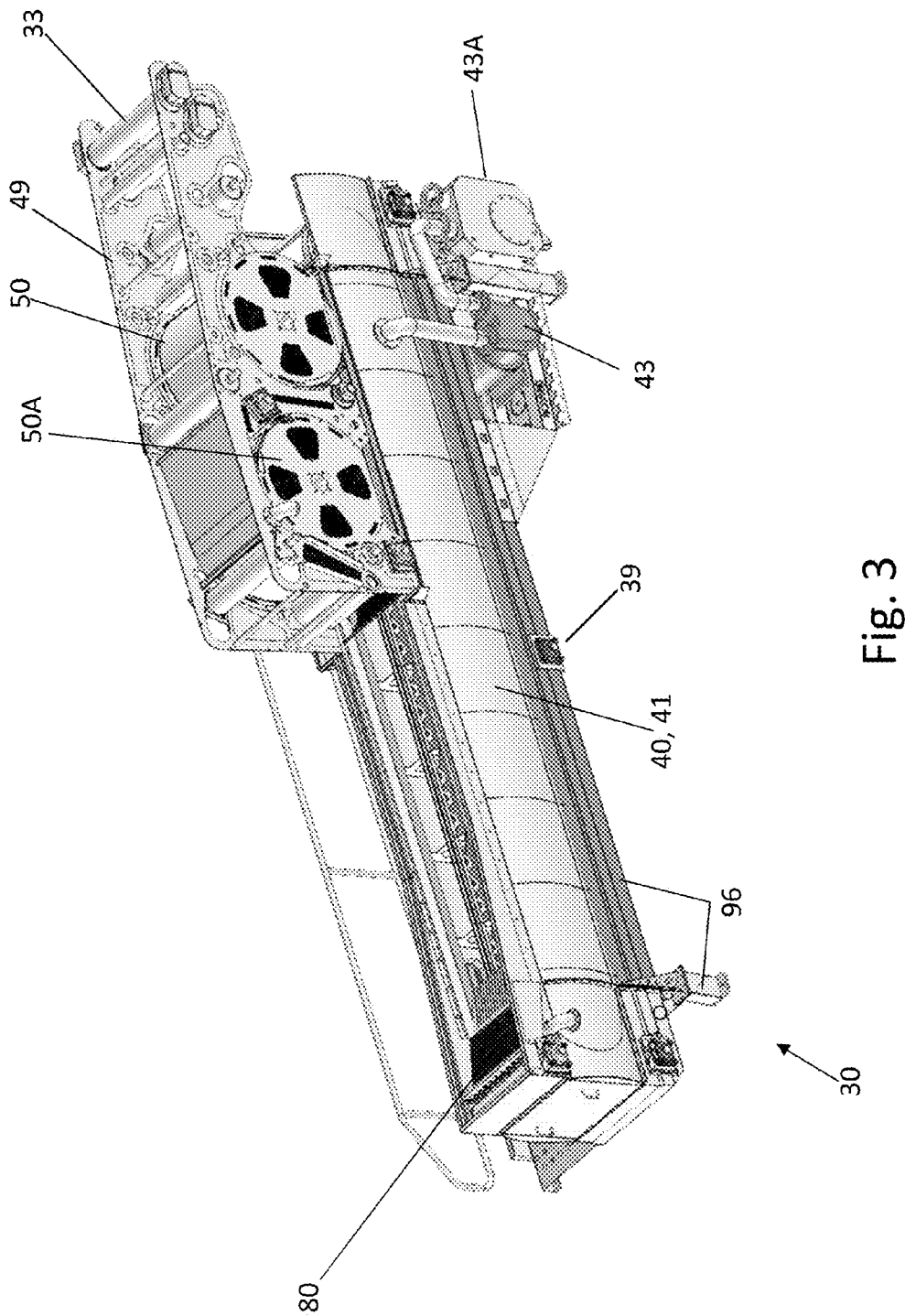
FIG. 3 is another view of the special dewatering machine called ecoFlex, with a vacuum and belt combination with the components and features shown from generally a top and isometric view.

FIG. 3 is another view of the special dewatering machine 30 called ecoFlex, with a vacuum and belt combination with the components and features shown from generally a top and isometric view. The components are the same as described above in FIG. 2.

Figure 4:
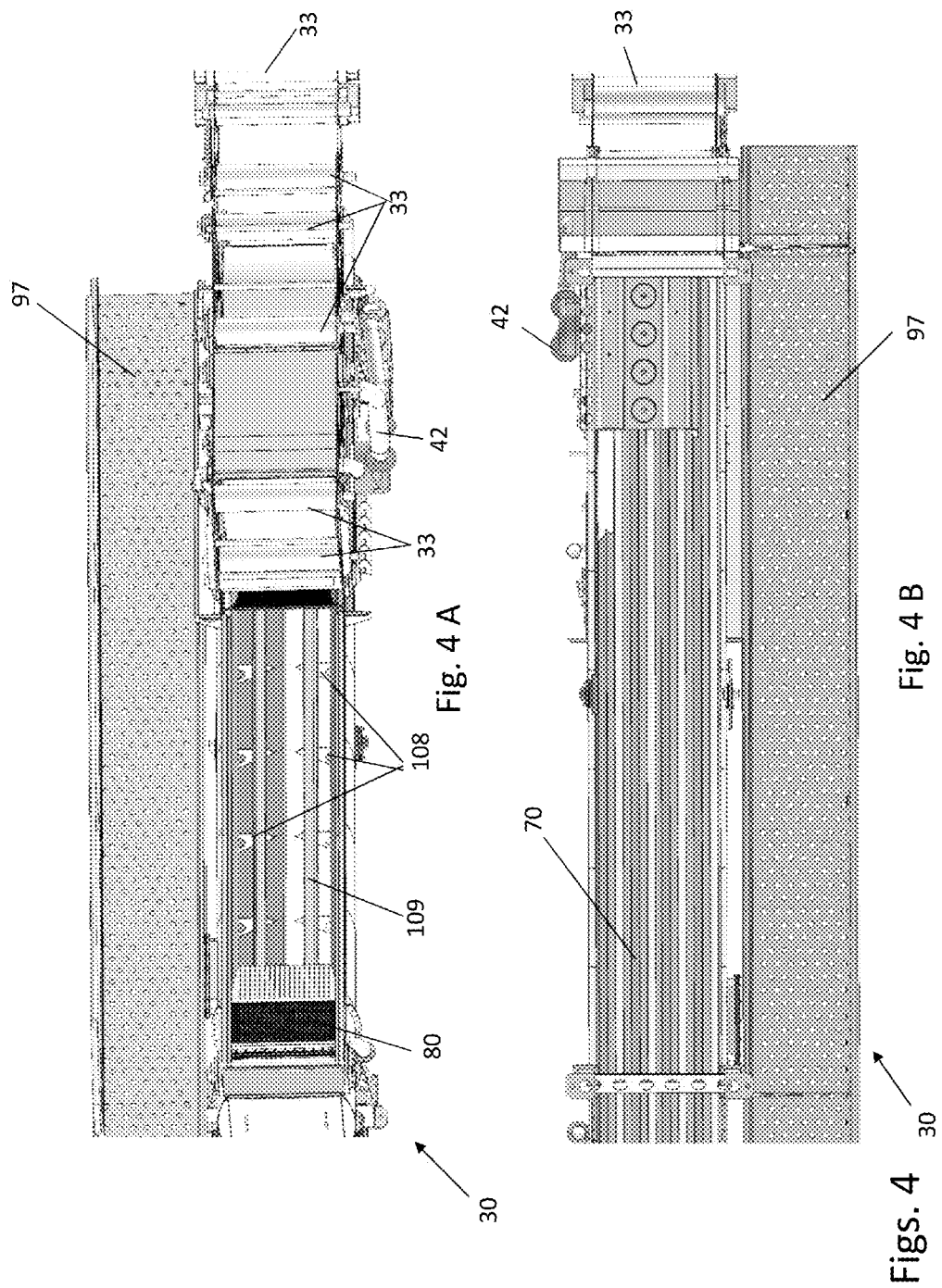
FIGS. 4 A and 4 B are sketches of the special dewatering machine called ecoFlex, with a vacuum and belt combination from a top and bottom view.

FIGS. 4 A and 4 B are sketches of the special dewatering machine 30 called ecoFlex, with a vacuum and belt combination from a top and bottom view. In FIG. 4 A the in feed 80 is followed by the channels 109 under the chain rollers and the vertical gusset plates 108. The optional work platform 97 and several of the belt rollers 33—which serve as transition and guides for the bottom/lower belt 31 and top belt 36—are demonstrated. The vacuum piping interconnection 42 is also shown. In FIG. 4 B, the lower tray 70 that is below the bottom/lower belt 31 runs the length of the machine from its high point at the out feed end to the low point on the in feed end 80. The tray is sloped and has a curved surface. This lower tray 70 provides a conduit for any liquid 86 removed from the slurry 85 by the lower vacuum chamber 40 or the drums 50, 50A. Other views show the interconnection piping from the chamber and drums to this conduit 70. At the lower end, below the in feed point 80 is a liquid drain pipe 92 (shown in other views) as an exit point.

FIGS. 5 A and 5 B are sketches of the special dewatering machine 30 called ecoFlex, with a vacuum and belt combination from a front and rear view. In these views are the components and features described above. In all cases, one skilled in the art recognizes the materials used to manufacture the structural members, enclosures and supports may be from a plethora of durable materials. For example, and not as a limitation, these include metals such as steel, aluminum, and the like. These may be special alloys such as stainless, and may be coated with plating, powdercoat, or inherently anti corrosive (like stainless). In addition, various composite materials such as high strength plastics and other materials may serve as well.

Figure 6:
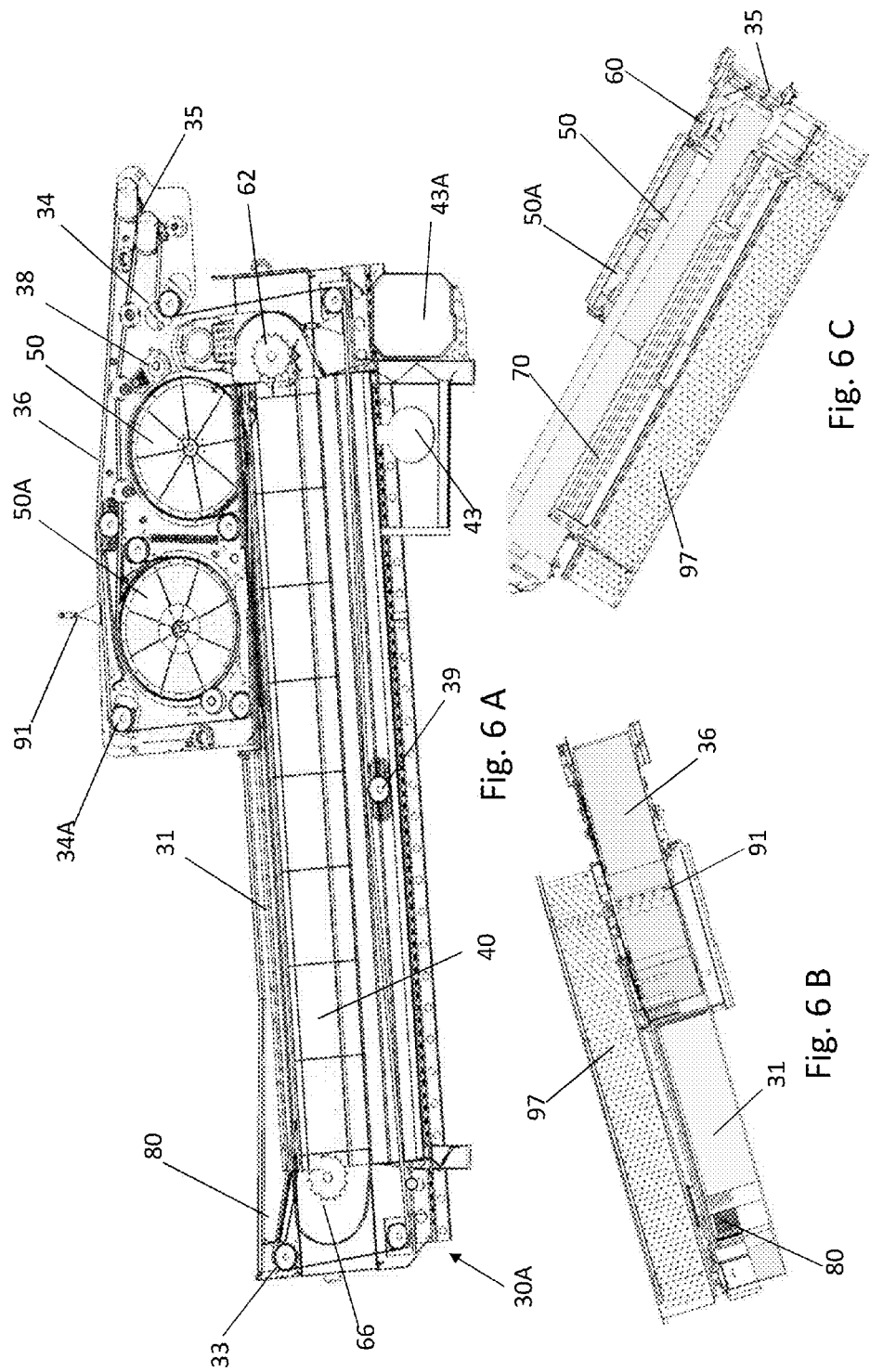
FIGS. 6 A through 6 C are sketches of the final assembly as a sectioned view essentially half-way down thru the center of the entire machine—with components and features shown.

FIGS. 6 A through 6 C are sketches of the final assembly 30A as a sectioned view essentially half-way down through the center of the entire machine 30—with components and features shown. FIG. 6 A shows all the components described including the in feed 80, the bottom/lower belt 31, the drums 50, 50A, the top belt 36, the various rollers 33, the tensioners 34, 34A, the tray sprockets 62, 66, the vacuum pump 43 and tank 43A, the product scrapers 35, the belt washers 91, and the tracking roller mechanism 39. These components are described above and in much detail in FIG. 8, below. FIG. 6 B is a top view and FIG. 6 C is a bottom view of the dewatering machine 30.

FIGS. 7 A through 7 C are sketches of the belt 31,36 combinations for the special dewatering machine 30 called ecoFlex, with a vacuum and belt combinations from several views. These are sketches from the top left hand corner belts. These show the layout of the belts. The bottom or lower belt 31 can be seen as the longer one that runs the length of the machine 30 and around the vacuum drums 50, 50A. The top belt 36 is a shorter one and runs mainly around the vacuum drums 50,50A in concert with the bottom/lower belt. As one follows the track along from the bottom belt 31, it slightly goes down. At that lower point, the area then goes under full vacuum (from chamber 40) and it goes on to the movable weight carrying support deck 101. As it enters the vacuum drum area 50, 50A, it makes various turns around rollers in concert with the top belt 36. The bottom/lower belt then runs past the removal scrapers 35, tensioners 34, a water spray clean-off 91 and the past a belt tracker mechanism 39 before it returns to the beginning point. The top belt 36 follows the bottom/lower belt 31 as it comes from the deck 101 and travels around the vacuum drums 50, 50A, then it separates from the bottom/lower belt 31, engages tensioner 34A, scape-offs 35 and the belt washers 91 and returns to the start.

Figure 8:
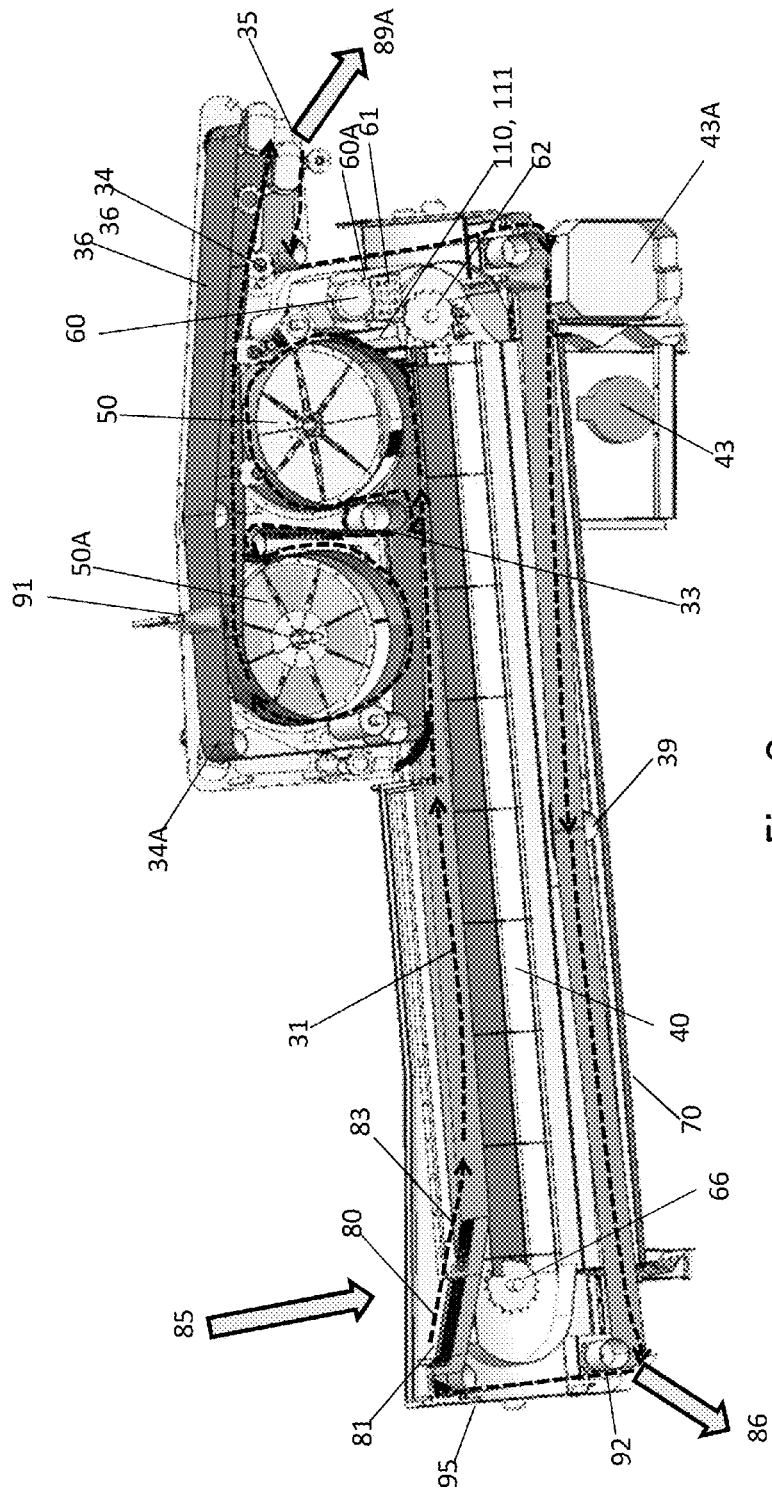
FIG. 8 is a cross section view of the entire special dewatering machine called ecoFlex, with a vacuum and belt combination.

FIG. 8 is a cross section view of the final assembly 30A as a sectioned view essentially half-way down through the center of the entire machine 30—with components and features shown. As noted, this assembly 30A has been sectioned half-way down thru the center of the entire machine 30. One may notice the bottom/lower belt 31 is slightly wider. This is to enable one to demonstrate how the track progresses through the different stages. Starting at the left hand side is where the slurry 85 of waste material enters the machine 30 (in-feed 80 of the [waste] product/slurry 85 to be treated and dewatered). Here at the top left end of the belt 31 (coming off of the first roller 33) and the tray chain 104 off the driven sprocket 66 is the area where it just slopes down slightly. This creates a small water area at a level 84 (shown and described below). As the slurry 85 comes onto the bottom/lower belt 31, the water/liquid 86 and solids 87 first start to separate and this is where the solids 87 start to pre-coat 84 the bottom/lower belt 31. The excess water/liquid 86 travels "backward" in a "puddle" and some initially overflows to the drain pipe 92 below. This initial area is not yet entered the lower chamber and therefore is not under vacuum. One may see that just after the end roller 33 before entering the in feed area 80, there is a flap 81 or means for pushing the solids 87 onto the top of the bottom/lower belt 31. Here strip of plastic/rubber 81 above the belt 31 is forcing the material down. Next the slurry material 85 is just leaving the water puddle and comes through and holding product 85 down onto the bottom/lower belt 31. The bottom/lower belt 31 and vacuum chamber 40 combination is not yet actually "sucking" at this stage.

As the waste slurry 85 goes down into the next stage, now the vacuum of the lower chamber 40 begins to come on and act gently. In this area and then the area beyond, the vacuum between the chamber 40 and the weight of the paste material 88 is used to hold the bottom/lower belt 31 down against the movable weight carrying support desk 101. One may see the vacuum action from the paste 88 because as one can see if the bottom/lower belt 31 is pulled tight (fully tensioned) the bottom/lower belt 31 would not necessarily seal down on the bottom support trays surface 100A as it required/designed. As the vacuum from chamber 40 comes on gently to the lower belt 31, the water removal and stirring of the slurry 85 are causing a "paste or wet cake" 88 to build up on the top surface of the bottom/lower belt 31. This action of the pre-coat 84 forming and the paste 88 being spread with the pre-drum wiper/scraper 35A is very important because it actually spreads the paste 88 on the bottom/lower belt 31. This pre-coat of paste 84 provides the dewatering machine the ability to actually get a much thicker cake 88 forming "early-on" (early in the dewatering process and continuing with the material travelling on the bottom/lower belt 31). After moving beyond the initial in feed, the belt 31 moves into a second area where the vacuum is starting to come on, the bottom/lower belt 31 begins a slight rise upward with the angle of travel. From here on to the vacuum drums 50, 50A, there is a full vacuum and the bottom/lower belt 31 is fully supported by the movable weight carrying support deck 101. The deck 101 supports the lower belt membrane 32 and the membranes support the cake 88 or slurry/debris 85 that is on the top surface of the bottom/lower belt 31. As the cake/debris 88/85 continues to progress toward the drums 50, 50A, the vacuum from the lower vacuum chamber 40 continues pulling the water/liquid 86 out of the debris/cake 85/88 through the bottom/lower belt 31 and removing/dewatering the paste/cake 88 of the debris/slurry 85. As one follows the bottom/lower belt 31 up the slight incline, one will encounter a vacuum drum 50 at the length of the incline. Just a little prior to the drum 50, a paste scraper 35A provides additional movement to the paste/cake 88. Traditionally, cracks form in the cake as it dries. These cracks create air ways that "break" the vacuum. The paste scraper 35A helps prevent the creation of these airways/vacuum breakers. Additionally, the paste scraper 35A will "burst" or break water pockets in the paste 88, permitting more liquid/water 86 to be "sucked" into the vacuum chamber. This dewaters the slurry 85/paste/cake 88 even more, providing additional moisture/water 86 removal.

As one can see after the scraper 35A, there is a second top belt 36 that engages the cake 88 material. Here the second top belt 36 is designed to hold the cake 88 product while it going around the vacuum drums 50, 50A. At the point where the cake 88 is trapped between the second top belt 36 and the l bottom/lower belt 31, the two belts (bottom/lower and top) 31,36 turn upward and follow around the initial vacuum drum 50. Here, the caked [waste] product 88 is actually turned upside down and sucked from the top side though the top belt 36 and into the initial vacuum drum 50. So as the cake material was coming out the slope on the bottom/lower belt 31 and being pulled by the chamber 40 below, the transition seal 56 (explained elsewhere herein) now has the cake 88 being pulled in an opposite fashion since there is a little bit of cake 88 that stores some moisture 86 up on top. One sees that at around the rear position of the initial vacuum drum 50 at about the two o'clock (2:00) position, there is another roller which is the first crush/press roller 38. This roller 38 is designed to do is give the cake 88 product a bit of a squash to break the cells of liquid/water 86 and airways from cracks to again permit the vacuum to seal by the moisturized paste 88. The belts 31,36 and material 88 keep coming around the initial vacuum drum 50 as far as possible to get the maximum wrap 37 of the belts 31,36 around the vacuum drum 50. There is a vacuum roller transition seal 56 (described elsewhere herein) that maintains the vacuum seal as the belts 31,36 transition away from the initial vacuum drum 50. The transition 56 sealing the product 88 between the belts 31,36 now is sealing the vacuum from getting into that drum 50 giving it a higher vacuum because the cake 88 won't let any air go through belt/cake combination. This doesn't require much power since the vacuum is maintained and the vacuum pump 43 need not supplement a loss of vacuum.

Next, at about eight o'clock (8:00) position on the initial drum, both of the belts 31,36 go around the bottom roller 33 and then go vertical. Here the bottom roller 33 actually moves the product 88 slightly. This is the first big radius change that the cake 88 product has encountered. The radius change just moves the material slightly because there are two belts 31, 36 going at slightly different speeds. If the paste/cake 88 is binding up, losing liquid/water 86 flow, creating air tracks, etc. this gives the cake/paste 88 new water tracks and new air tracks around the top belt 36 and then seals on to the second vacuum drum 50A. The belts 31,36 and cake 88 material continue essentially vertically and transition around another belt roller 33 and onto the second drum. Again, there is another vacuum transition seal 56 (described elsewhere herein) that maintains the vacuum seal as the belts 31, 36 transition away from the top roller and onto the second vacuum drum 50A. This second vacuum drum 50A is taking the liquid/water 86 out of the original side of the paste 88. The belts 31, 36 and cake 88 go around the drop there is another crush/press roller 38 around 8:00 position. That crush roller 38 again just moves the product 88 slightly and takes the blinding off the cake 88 and also breaks a few more of the liquid/water 86 cells to introduce the last little bit of liquid/water 86 that is still in the product 88. It comes around the second vacuum drum 50A and the transition seal 56 keeps the vacuum in the second drum 50A.

At the top vacuum roller seal, the belts 31,36 then move to the right hand end where the material scrapers 35 are mounted. As those scrapers 35 engage with the dry cake 89 and scrape off the cake 89 (normally if the cake product is dry enough it will just fall off) both the top 36 and lower 31 belts return back through rollers 33 and sophisticated tensioners 34, 34A which govern the tension on the belts 31, 36. The sophisticated tensioners 34, 34A are ones pulled and moved in two side slots to provide tension and those two sides/arms are timed. If wet or dry cake 88, 89 product builds up on one side of the belt 31,36 the whole roller 33 moves parallel in the tensioner 34,34A. This is important because if the roller 33 doesn't move parallel and is independent the belt 31 or 36 will start tracking off sideways very quickly and then one cannot control it. On one end of each tensioner 34,34A are roller bearings that are all adjustable. Each Roller 33 can be separately adjusted to get it absolutely "spot on" and parallel so it enhances the belt tracking. The adjustment comes down to the bottom roller where the belt moves around that roller 33 into belt washer 91 area.

The belt spray washer area 91 is up at the front end (out feed 89A end of the machine 30), so that all excess wash liquid/water 86 runs down the channel 70 type and that means the channel 70 is self-cleaning. No waste product 88, 89 builds up in those channel 70 areas because they are smooth and run down the full distance of the machine 30.

Next the bottom/lower belt 31 continues down to the next roller 33 in the middle of the machine. Here one finds a tracking roller mechanism 39. This tracking roller mechanism 39 is absolutely vital because it pulls the control roller from one side forward or backwards which then in turn puts an angle on the directional roller to the bottom belt 31. This angle pushes the bottom/lower belt 31 one way or the other way. If the tracking roller mechanism 39 is centered on the bottom/lower belt 31 and square to the belt 31, then the lower belt 31 would be just running true and with no tracking on the roller. As soon as one moves the tracking roller backwards or forwards, this puts an angle on the belt 31 and moves the belt one way or the other. After the tracking roller mechanism 39, the belt 31 will follow that line down to the last belt roller 33 and then that takes it back up to start the process over again at the in-feed 80 of the machine 30. At this point, there is a guard with the little piece of rubber 81 on it so even if that water puddle area described above overflows the will only overflow into the water pipe and take the excess water back into a sump. This means one may run the machine 30 in an overflow mode all the time to make sure to get a maximum amount of slurry and flow on to the in-feed and lower belt.

As for the top belt 36 if one starts at the center of the machine 30 and follows the travel to the right, the top belt 36 slopes down so the top belt 36 is going to put a crush onto the bottom/lower belt 31 just as the both touch and converge. This area where the belts 31,36 meet is quite an important area. There is an end seal 110 on the back of the top belt 36 and an end seal 110 on the back of the lower belt 31. At this back of the two belt intersection there are also side seal members 111 which actually seal on the sides and which actually seal the first drive roller to the bottom of the deck 101. This seal is absolutely important and this is one of the hardest vacuum seals to accomplish. This is because the drive roller is rotating yet it must seal the vacuum while still being a very low friction resisting the belt movement. This intersection is seen in other drawings (Ref FIG. 13). The low friction seal is accomplished with plastics that are quite efficient. They are high efficiency matches of the surfaces with a stainless steel. By using a little bit of pressure on the water flowing, this keeps the side seals and the other seals discussed above efficient and explains why a little bit water leaks and gives the interface of the sea and belt a little better lubrication. From the back there is a little interference seal on the back of the belt 31 from the center of where it comes off the tray. That means the belt comes off the movable weight carrying suport deck 101 very easily because there is a nice neutral area and the cake product is bound from both sides (top 36 and lower 31 belts) and it will release from one belt and then re-engage again with the other belt when it goes back on the vacuum drum 50 and the dewatering will continue. The bottom/lower belt 31 edges follow the second top belt 36 around trapping the debris 85 material as the cake 88 in between those two belts 31,36. This differs from traditional dewatering machines because when the cake starts to dry out on a traditional machine the cake starts cracking and one will have to spray water on the dryness of the belt. This newly invented dewatering machine 30 holds the cake 88 in one place, squeezes it in that place, creates a paste seal 88 to maintain the vacuum, and seals a nice and uniform cake or paste 88 across the roller. Therefore, there is no loss of any vacuum or anything like that.

Further, the two vacuum drums 50,50A supplement the vacuum dewatering along the length of the belt. This gives the paste/cake material a lot of time under pressure. Since dewatering a material is all about pressure over time this machine dewaters with a very, very small foot print and length of the belt that actually runs the product under pressure.

Figure 9:
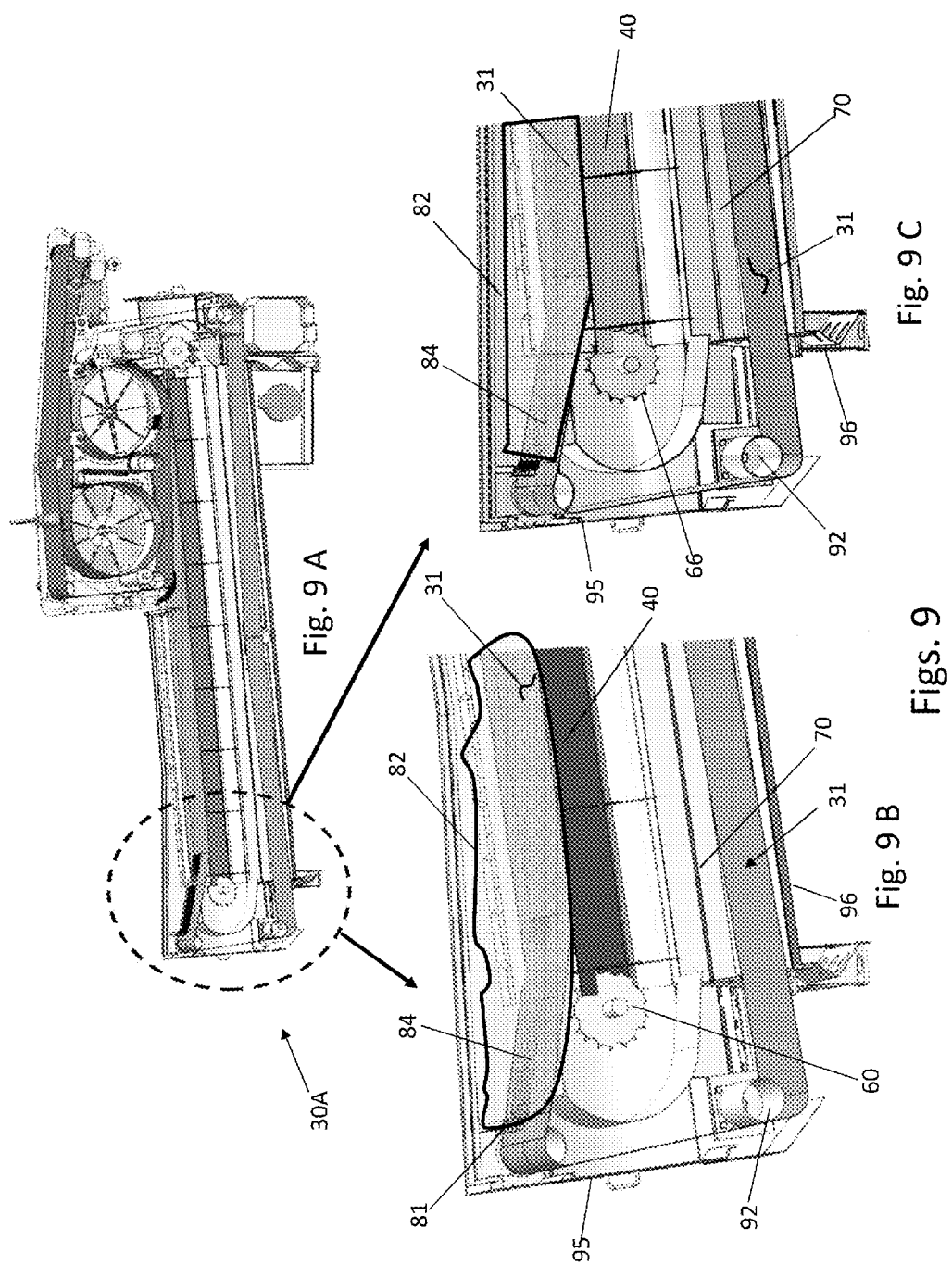
FIGS. 9 A through 9 C are sketches of the special dewatering machine at the in-feed area with features and components shown.

FIGS. 9 A through 9 C are sketches of the special dewatering machine 30 at the in-feed area 80 with features and components shown. The sketches show up close the action described in FIG. 8. At the left hand side is where the slurry 85 of waste material enters the machine 30 (in-feed 80 of the [waste] product/slurry 85 to be treated and dewatered). Here at the top left end of the belt 31 (coming off of the first roller 33) and the tray chain 104 off the driven sprocket 66 is the area where it just slopes down slightly.

This creates a small water area at a level 82 (shown and described below). As the slurry 85 comes onto the lower belt 31, the water/liquid 86 and solids 87 first start to separate and this is where the solids 87 start to pre-coat 84 the lower belt 31. The excess water/liquid 86 travels "backward" in a "puddle" and some initially overflows to the drain pipe 92 below. This initial area is not yet entered the lower chamber and therefore is not under vacuum. One may see that just after the end roller 33 before entering the in feed area 80, there is a flap 81 or means for pushing the solids 87 onto the top of the bottom/lower belt 31. Here, a strip of plastic/rubber 81 above the belt 31 is forcing the material down. Next, the slurry material 85 is just leaving the water puddle and comes through and holding product 85 down onto the bottom/lower belt 31. The bottom/lower belt 31 and vacuum chamber 40 combinations are not yet actually "sucking" at this stage.

FIGS. 10 A through 10 C are sketches of the cross sections 30A of the ecoFlex machine 30 just ahead of the top belt engagement 36 with the bottom/lower belt 31 showing the wiper mechanism 35A. The lower belt 31 is carrying a paste 88 and the wiper 35A blurs and wipes across the paste 88 to continue to keep the vacuum seal for the chamber 40 "sucking" the liquid/water 86 through the belt membrane 32 and into the chamber 40. FIG. 10 A also shows a cross section of the motor 60/60A and gear box 61 connected by a means 62A and dragging the front drive sprocket 62 that pulls the tray/deck 101 along by the roller chain 104. This also shows the front pulleys 67,68 for the top and lower belts, respectively.

Figure 11:
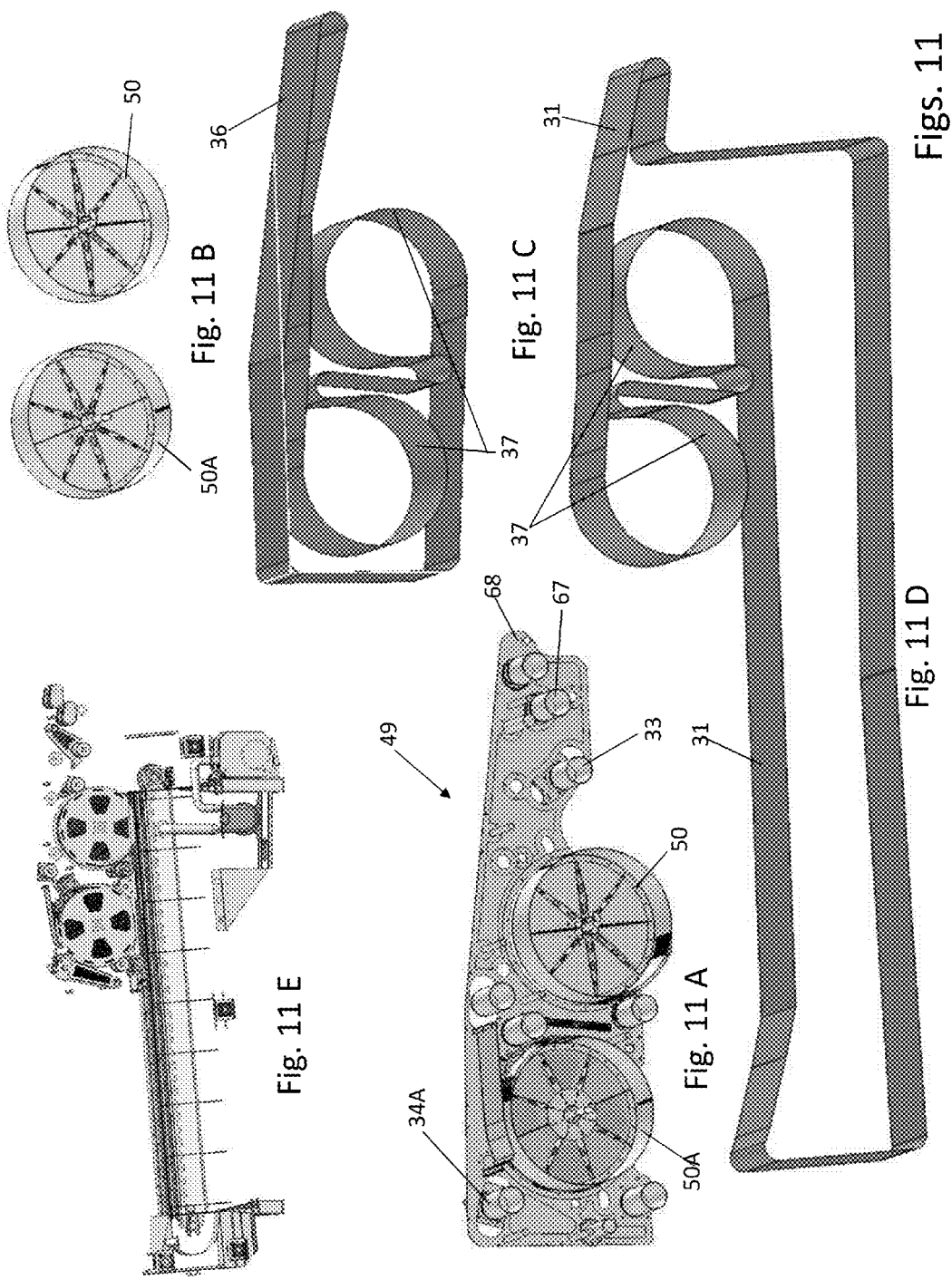
FIGS. 11 A through 11 E are sketches of the drum and belt components for the dewatering machine.

FIGS. 11 A through 11 E are sketches of the drum 50, 50A and belts 31, 36 components for the dewatering machine 30. FIG. 11 A shows the structural member and sides 49 for the drums 50, 50A. The front pulleys 67, 68 and the top belt 36 tensioner 34A are also demonstrated. FIG. 11 B shows the drums 50, 50A with the support splines and the sides. FIGS. 11 C and 11 D show the top belt 36 and bottom/lower belt 31, respectively. FIG. 11 E shows the entire machine 30 without the belts or enclosures so that the belt path rollers 33, drums 50, 50A and tensioners 34, 34A are easily seen.

Figure 12:
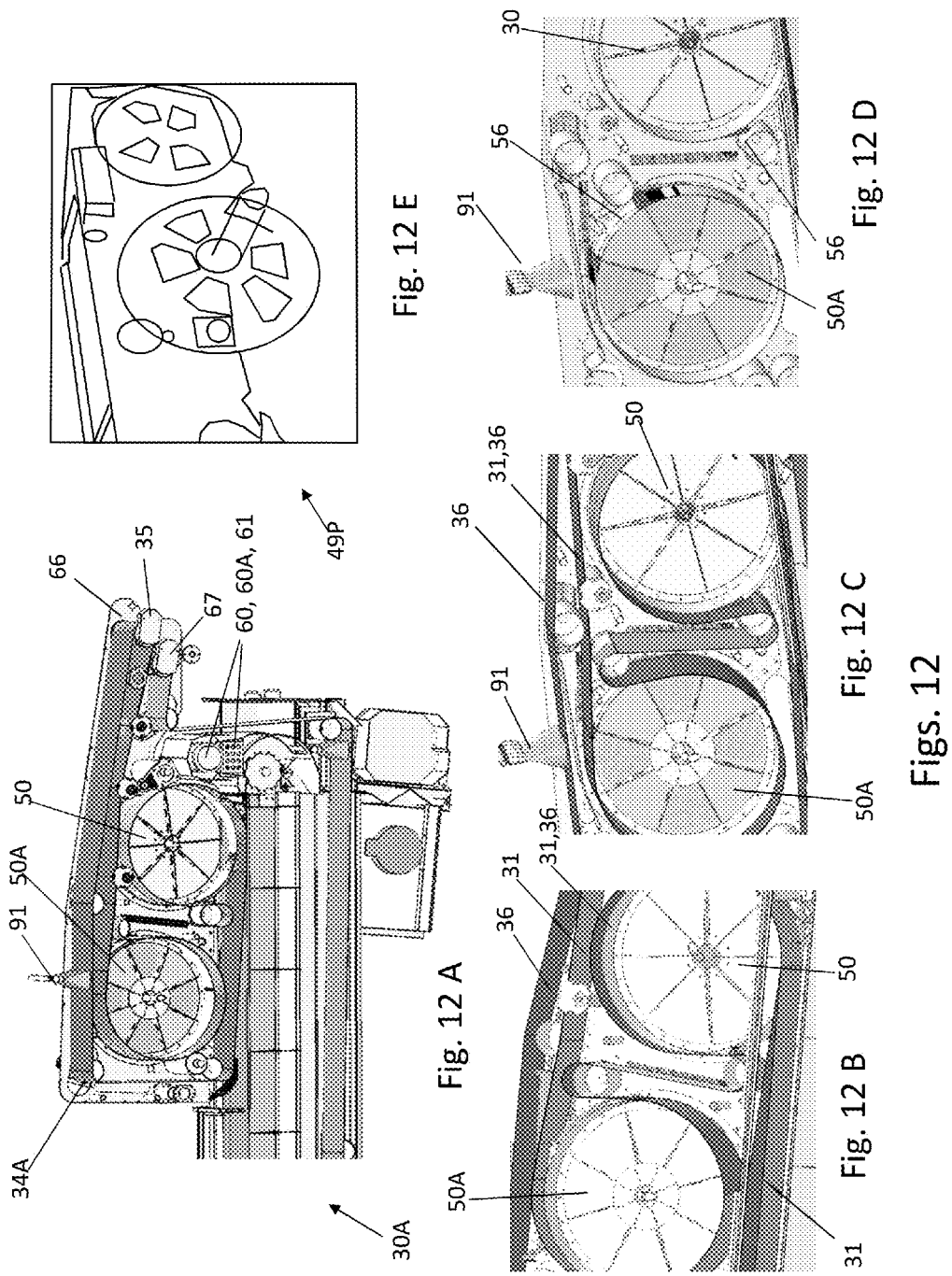
FIGS. 12 A through 12 E are sketches of the drum areas for the ecoFlex dewatering machine.

FIGS. 12 A through 12 E are sketches of the drum areas 50, 50A for the ecoFlex dewatering machine 30. One notes well the vacuum drum transition seals 56 which are explained below. One that is skilled in the art of material handling layouts well appreciates that additional drums 50B, rollers 33 and transitions 56 may be added to accomplish additional dewatering for various slurry 85 products. The amount of fibrous material 87 and effective diameters of the solid materials (fineness, and density) may merit added drums to further increase the presence of the vacuum exposed to the slurry 85.

Figure 13:
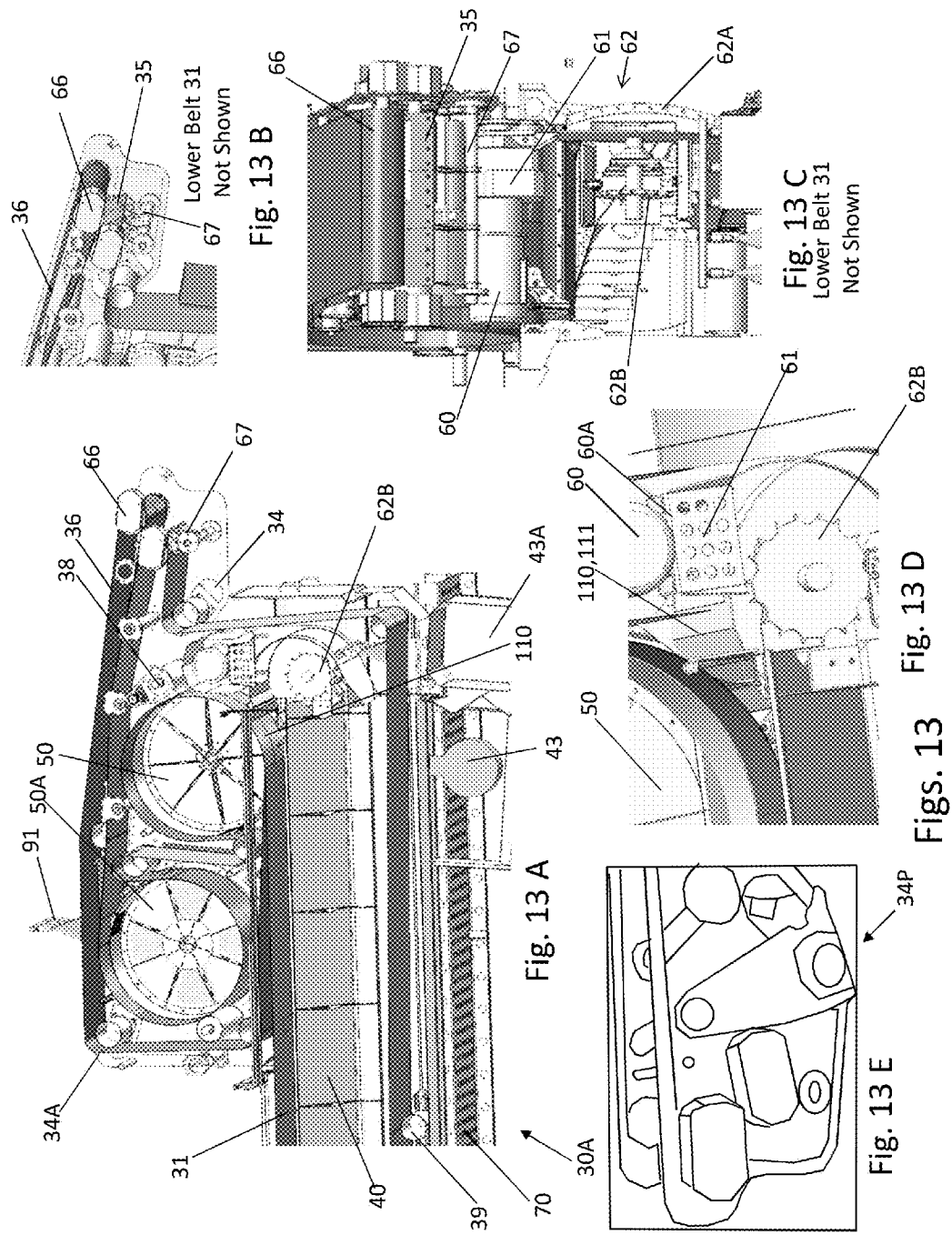
FIGS. 13 A through 13 E are sketches of the out-feed/ discharge areas for the special dewatering machine called ecoFlex.

FIGS. 13 A through 13 E are sketches 34P of the out-feed 89A/discharge areas for the special dewatering machine 30 called ecoFlex. FIGS. 13 A and 13 C show a good cross sections of the drums 50, 50A and the vacuum chamber 40 that is positioned under the movable weight carrying support deck 101. Likewise the vacuum pump 43 and tank 43A are shown from a side and end view. One may readily see and skilled persons in the art of vacuum systems may well appreciates that: the various chambers and drums may be individually regulated to vary the exposure of the paste 88 and slurry 85 for the different densities, fineness and viscosity of the materials being treated; and likewise, if necessary, the vacuum chamber 40 and one or more of the drums 50, 50A, 50B etc. may be on individual vacuum pumps and tanks, again to address various material consistencies for different products being treated. In other words, the chambers in and around the conveyors and drums can be on individual pumps or regulated zones (on the same pump) so that the various chambers and drums may be specifically set at the proper vacuum setting to optimize the dewatering performance at that zone. FIGS. 13 B and 13 C show the belt scrapers 35. FIG. 13 D shows the motor 60, gearbox 61 and means 60A to connect the motor 60 and gearbox 61. FIG. 13 E is the sketch 34P of the belt tensioner.

Figure 14:
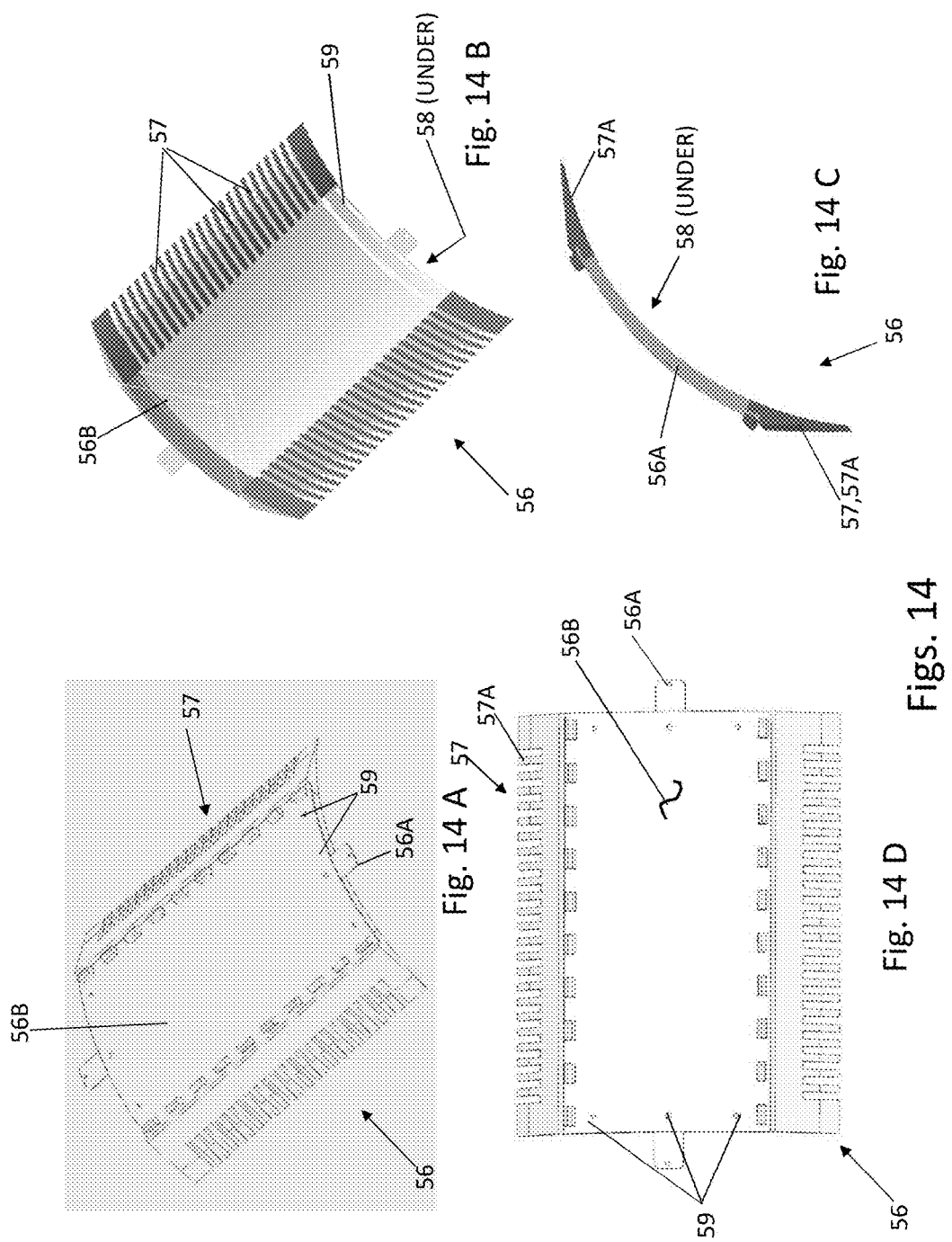
FIGS. 14 A through 14 D are sketches of the vacuum drum transition seal assembly with components and features shown.

FIGS. 14 A through 14 D are sketches of the vacuum drum transition seal assembly 56 with components and features shown. This view shows the vacuum seal transition assembly 56 for the belt transition points when the belts 31, 36 are traversing with the drum 50 around the outside circumference of the vacuum drum 50. This traversing of the belts 31,36 and cake product 88 when being sucked in toward the center of the drum 50, 50A and against the drum surface 56B is helped by the bearing system 49A, 49B of the vacuum drum 50, 50A. As the belts 31,36 reach the transition point and move away from the drum 50, 50A, the vacuum in the drums 50, 50A need to be maintained with little or no leakage of the air/vacuum. Likewise, the movement of the belt away from the drum's surfaces 56B and toward the next belt roller 33 (and turning point) is preferred to be as friction-less as possible. There are a couple of ways used to do that. Because the belts 31, 36 are being pulled in tension by the tensioners 34, 34A so hard, there is a nice little fine rising or edge of the belts 31, 36 to actually help start to lift and transition the belt surface off the vacuum drum 50, 50A. This lifting is assisted by these tapered fingers or comb-like configurations 57. These tapered fingers 57 are designed to start to lift the belt surface and still maintain the drum vacuum with minimal air/vacuum leakage. One tries to keep the vacuum on the belt as long as possible. The other thing that is accomplished is that the vacuum seal assembly acts as a little bit of a guide. As the belt moves across the vacuum seal transition assembly 56, the surface of the belt area is actually no longer being pulled by vacuum. So it reduces the "vacuum suck-in" toward the center of the drum and makes it a lot easier to pull the belt over the plastic comb 57 or transition of the vacuum seal assembly. The polyester belt 52 easily slides over these pieces of plastic with very little friction. Therefore, it takes little power to take the belt forward to the next roller 33. Due to the design, these nylon/plastic, composite material or plated steel alloy comb-like fingers should last for years. Because there are two points on each vacuum seal transition assembly 56, where the belt transitions, the objective is to limit the friction because the added pull-away force may cause a vacuum break. Therefore it is desired to make the friction at the contact points as minimal as possible. Here there is achieved a bit more or extra anti-friction as the configuration creates a small piston channel 58 between the drum along the solid edges and the solid plate area of the vacuum seal assembly. In this piston channel area 58, water is introduced from the nearby wash lines 90, creating a piston action by the water pressure. Between the piston channel 58 and drum surface 51 is the pressurized water and the vacuum drum 50, 50A is actually floating or supporting with water the vacuum seal assembly in the created piston channel area 58. Thereby, the metal stainless section of the vacuum seal assembly is actually floating and doesn't have any pressure on the vacuum drum 50, 50A what so ever. This floating helps to pull the belt away and transition without creating a breaking effect. The section views help to further demonstrate how this works. This is unique to the industries served.

Figure 15:
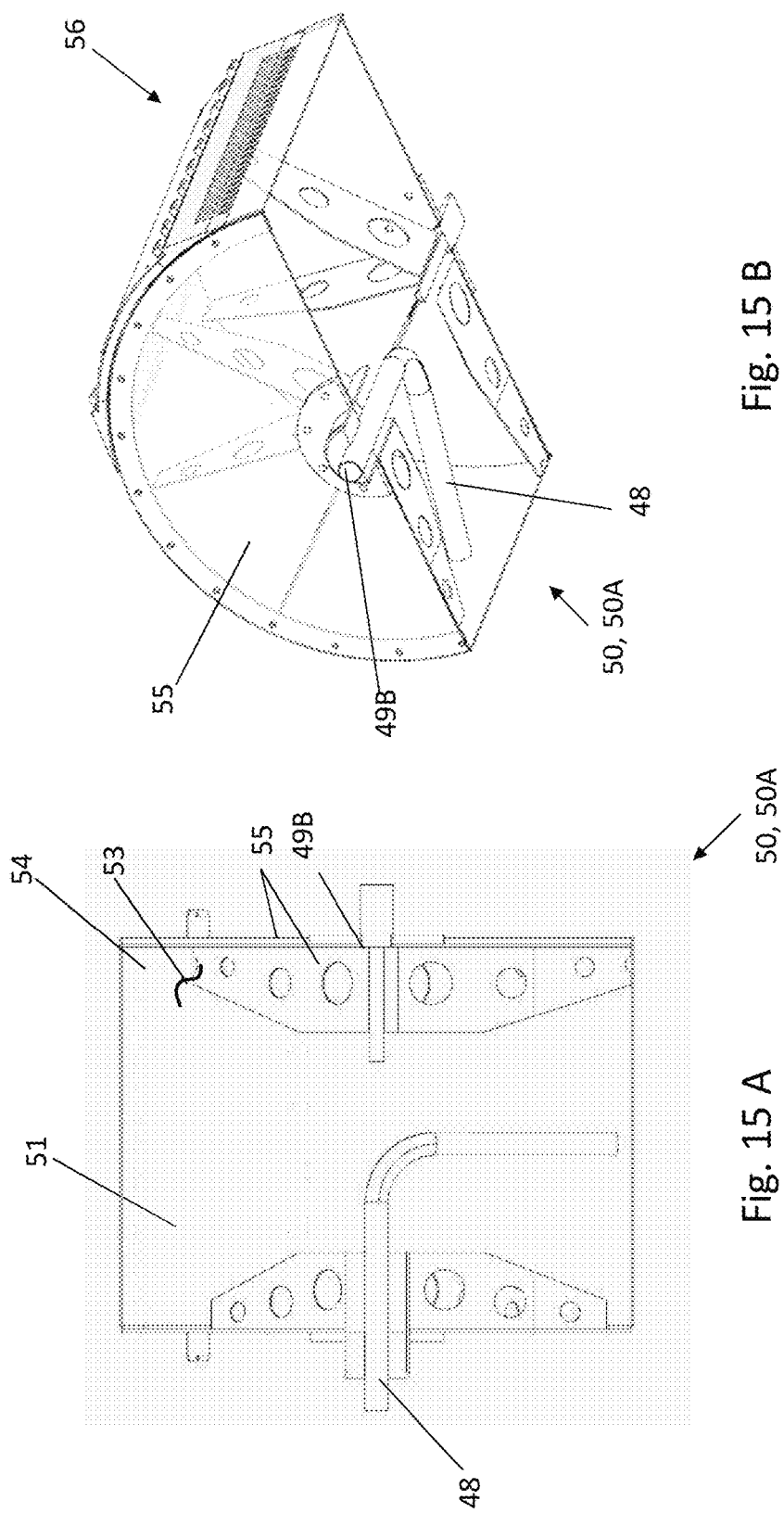
FIGS. 15 A and 15 B are additional sketches of the special vacuum drum transition seal assembly from other viewpoints.

FIGS. 15 A and 15 B are additional sketches of the special vacuum drum transition seal assembly from other viewpoints. Here is shown and described the vacuum roller transition seal 56. This similar design is used for both the first and second vacuum drums. They are both the same except for the sealing strip being in a different place. On sees in this sketch the pipe 48 that is used to pull the vacuum through it from the vacuum pump 43, lower chamber or separate/unique pump 48 that goes only to the drum 50, 50A. The pipe 48 or connecting means will also serve to take the water down to the bottom and also extract any of the filtrate 86 that goes out with the vacuum pull as well. This seal 56 works extremely well and basically allows one to control the amount of vacuum by just a valve or regulator that actually operates the amount required/desired to dewater. One can see the side 55 is well supported and the vacuum from the stainless pipe enters through side (htp) bushings 49B with very tight tolerances. Then there is a lubrication fitting/grey screw to give the bushing a little bit of lubrication. The lubrication also serves to help seal any minute leaks. This vacuum drum transition seal 56 works between the belts 31,36 and the drums 50, 50A to maintain the vacuum in each drum as the belt moves around the machine. These vacuum drums/rollers have about 25,000 holes (apertures 52) punched around each. This means that basically once a membrane/belt 52 lies contiguously against the vacuum drum surface 51, any moisture trapped in the debris 85 on the belt(s) 31,36 can be extracted into the vacuum drum roller 50, 50A. Then the extracted moisture just drops down the drum and is extracted out of that pipe connection 48.

Figure 16:
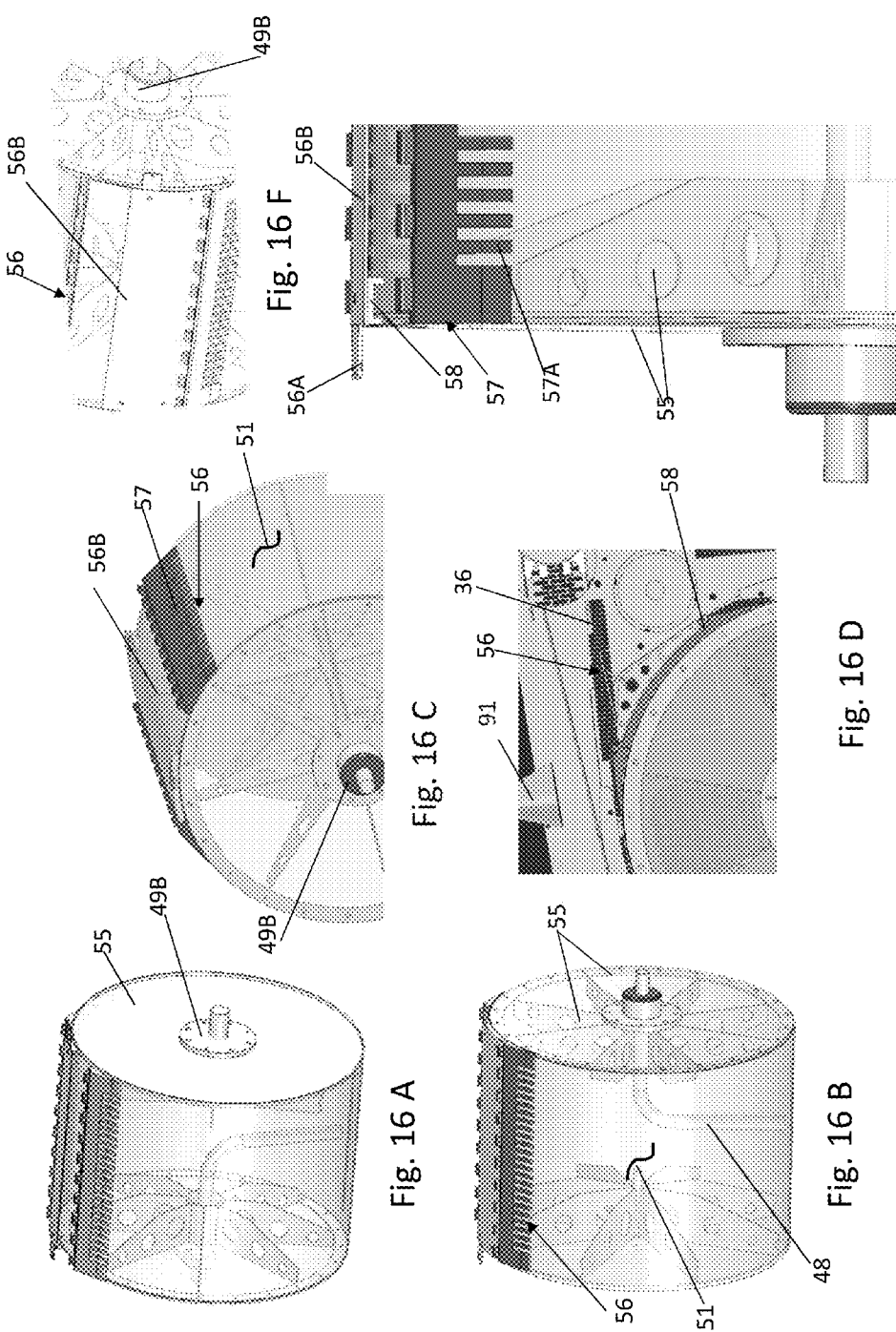
FIGS. 16 A through 16 F are sketches and details of the vacuum drum seal assembly including the piston mechanism for frictionless transitions from the vacuum and non-vacuum zones.

FIGS. 16 A through 16 F are sketches and details of the vacuum drum transition seal assembly including the piston mechanism 58 for frictionless transitions from the vacuum and non-vacuum zones. Here is shown a cross section at the top view just showing the two bits of plastic, composite or equal material that actually transitions the belt 31,36 on and off. Also shown are the cross sections of two outside bits of plastic 57, 57A. This part 53 of vacuum drum roller at the end 54 of the drum is a smooth and solid, having no holes. The surface of the vacuum drum goes just to the inside. This area is where the inside of the vacuum seal assembly creates a piston channel 58. The drum apertures 52 then start just on the inside of the outside slots if the finger 57A and comb-like configurations. This configuration is design such that this area around the outside of the drum surface 53 is solid. One notes that this is where the water pressure is put into the slots/channels 59 and the pressure holds all of that area of this vacuum transition sealer 56 off the drum 50, 50A. Therefore, this transition has very little friction on those drums. However, the drums must be essentially as near absolutely and perfectly machine round for this transition and interface to work successfully. Otherwise there can be excessive water leaks. To allow for any inherent out-o round or uneven-ness a soft rubber seal 58A (not shown) is placed on the toes of the piston channel 58.

FIGS. 17 A and 17 B are more sketches and descriptions for the vacuum drum transition seal and belt transition mechanism 56. Here the sketches are showing the illustration of the belt 31,36 coming on the vacuum drum transition seal 56, going around (with) the drum 50, 50A as it turns, and then and coming off the vacuum drum transition seal 56 and progressing through the machine 30. The drum seal actually seals the vacuum when it pulls the belt 31,36 against the fingers 57. This is during the time the belts 31,36 are going onto and coming off of the vacuum drums 50,50A. So the cake product 88 is held between the two belts (top 36 and bottom/lower 31) and this vacuum drum transition sealer 56 is what does the sealing and holds vacuum inside the machine and inside the drums 50,50A. One should remember that the pipe 48 in the center of these drums brought the vacuum and also is extracting the water with the vacuum. This is very simple, low friction device and makes a very nice compact unit. One skilled in the art appreciates that one can also put press wheels on the outside and benefit the drawing. These drum transition seals 56 actually serve to break the water from the moisture cells and once the vacuum reaches that moisture cell, it just pulls the moisture/water straight out. This differs from a belt press in that the belt press uses enormous weight on the belts. This new dewatering machine doesn't require or run those high pressures on the belt. This is because of this other combined vacuum means of extracting liquid and once the cells are broken. A belt press relies on the actual squeeze pressure to get the moisture out. What is used here is the dual belt 31,36 squeeze and a vacuum present as the product cake 88 actually starts working. Once the product is dry cake 89, it acts and gets like a piece of blotting paper in the water above/next to it will actually come through it and that is what allows for a good seal. The cake 89 thickness can actually be quite important to maintain a reasonably thick cake. This prevents cracking of the product or anything like that which would create vacuum leaks and things like that between the two belts 31,36.

Figure 18:
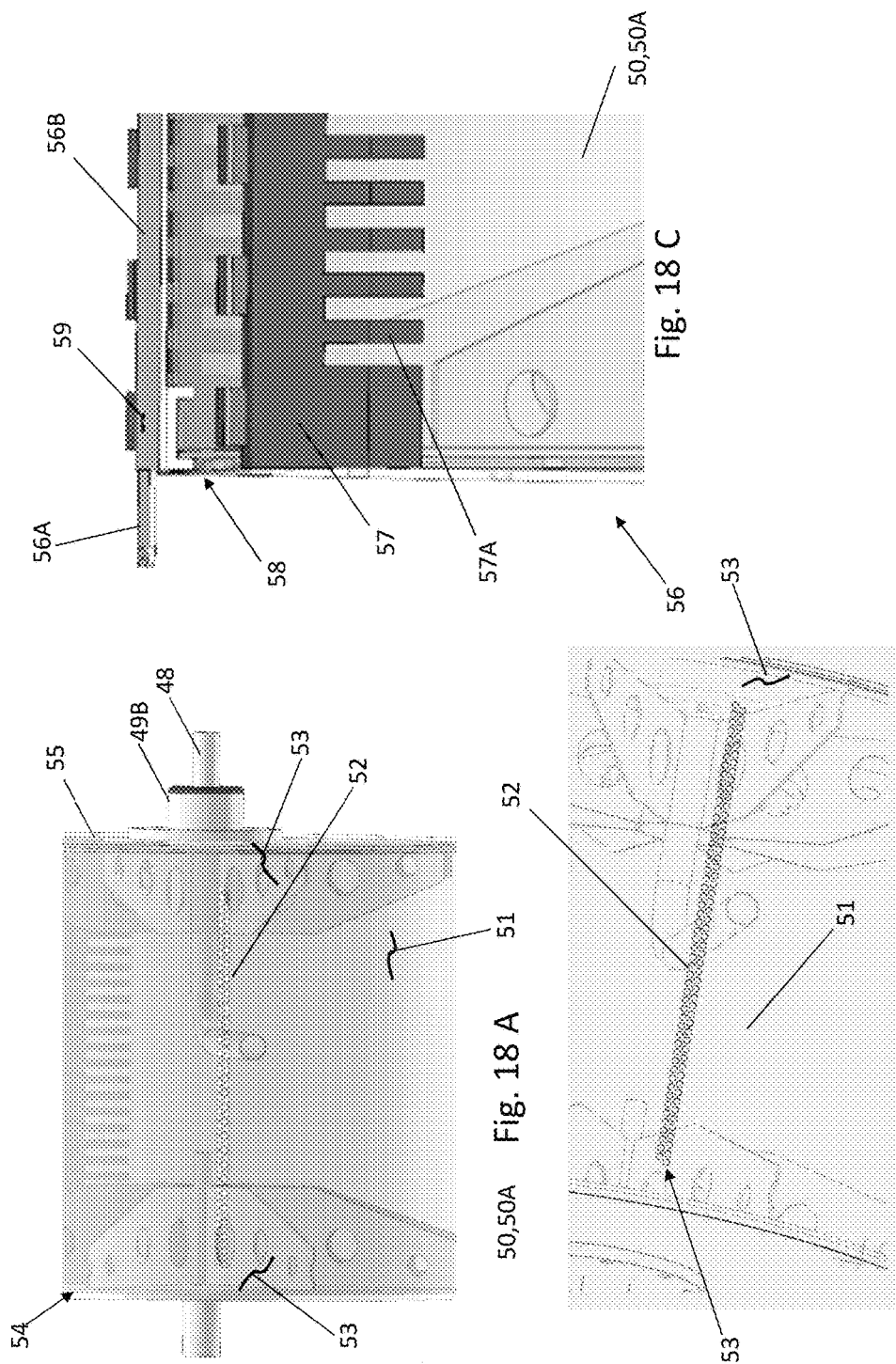
FIGS. 18 A through 18 C are the final sketches of the vacuum drum transition seal with components with features and details noted and described.

FIGS. 18 A through 18 C are the final sketches of the vacuum drum transition seal 56 with components with features and details noted and described. These additional sketches show other features of the vacuum seal assembly. There are many apertures or holes 52 in the sheet material that goes right around the entire cylindrical surface 51 of the drum. The sketches show only two of the rows of the sheet with the apertures 52. These holes 52 are around the full drum surface 51 except at each end near the supporting sides 55 of the vacuum drums. Here on each end 54 near the sides 55, there is an area 53 where there are no apertures/holes 52 in the surface. The surface sheet is made of solid sheet material rolled into the cylindrical configuration. The solid end area 53 is where the piston channel 58 (with the toe seals 58A) operates to take the weight off the major part of the whole machine, especially the vacuum drums 50, 50A. The water action of the piston channel 58 also does a second job as well. Any small or minor discrepancy in the drum surface and the belt interfaces or anything like that, the water will just cushion the amount of air that is sucked in by the vacuum; hence the water basically creates a water seal as well. Therefore the end solid zone 53 not only just stops any vacuum coming into the drum 50, 50A but it also carries the weight of the large area that is being used to transition and extract the belt 31,36 on and off the drum surface 51 while not permitting any vacuum to come off.

Figure 19:
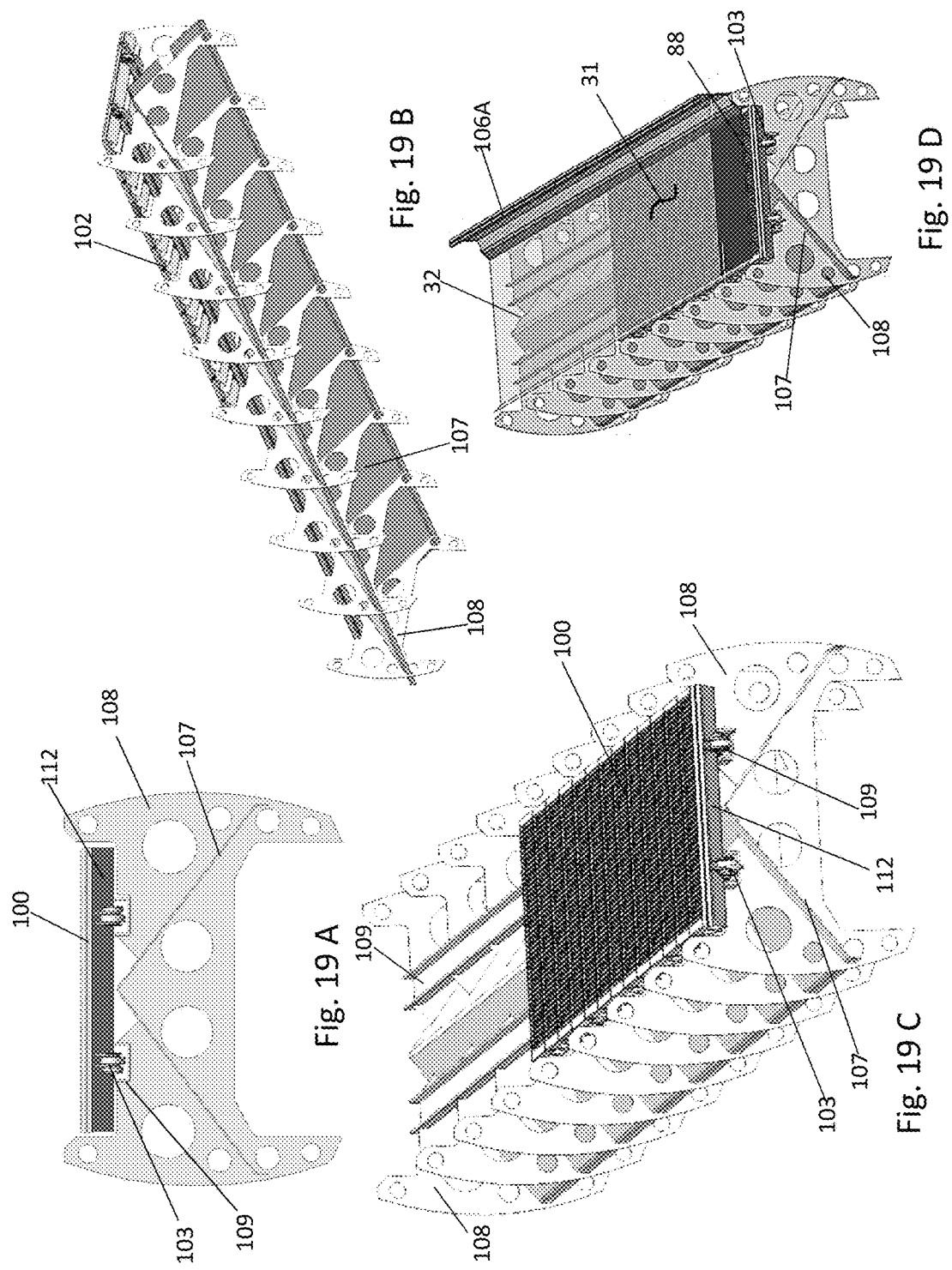
FIGS. 19 A through 19 D are sketches of the trays in a frame showing the component details and features.

FIGS. 19 A through 19 D are sketches of the trays 100 in a frame showing the component details and features of the movable weight carrying support 101. Here is a sketch of a cross section of the dewatering machine 30 that shows how it can carry the weight and move along the tray bearing and rollers 103. If one desires and wanted to carry much more weight, one skilled in the art of conveying and handling materials appreciates that the movable weight carrying support deck 101 may be made wider and add additional rollers 103. The gussets 108 and lower inverted "vee" plates 107 would then need to permit additional rollers 103. Now these trays 100 are totally contained and any filtrate liquid 86 that passes through the top of the tray 100A goes out sideways to the end of the tray and then impacts on the inverted "vee" 107 with a 45 degree guide inside. This guide also is actually holding most of the side screen so that maintains and keeps all the trays 100 and cross members in a secured and straight position. The filtrate liquid 86 drops onto the "vee" 107 and then drops down onto the side and then falls to the bottom tray 70. Here it runs to the low point and exits the chamber 40 at the water pipe 92. It is believed that this is the only dewatering system where the filtrate 86 can never reach the rollers 103 and any sand, grit and things like that do not get to the rollers and thus the initial in-feed is a simple, open belt. Once the slurry is on the belt, the filtrate 86 is controlled, put around the sides, and exits while the cake 88 is on the belt membrane 52 and supported by the movable weight carrying support deck 101. Shown in the views are also the multiple sections of trays 102 the tray support brackets 112, and the support channels 109 under the chain 104 and rollers 103.

Figure 20:
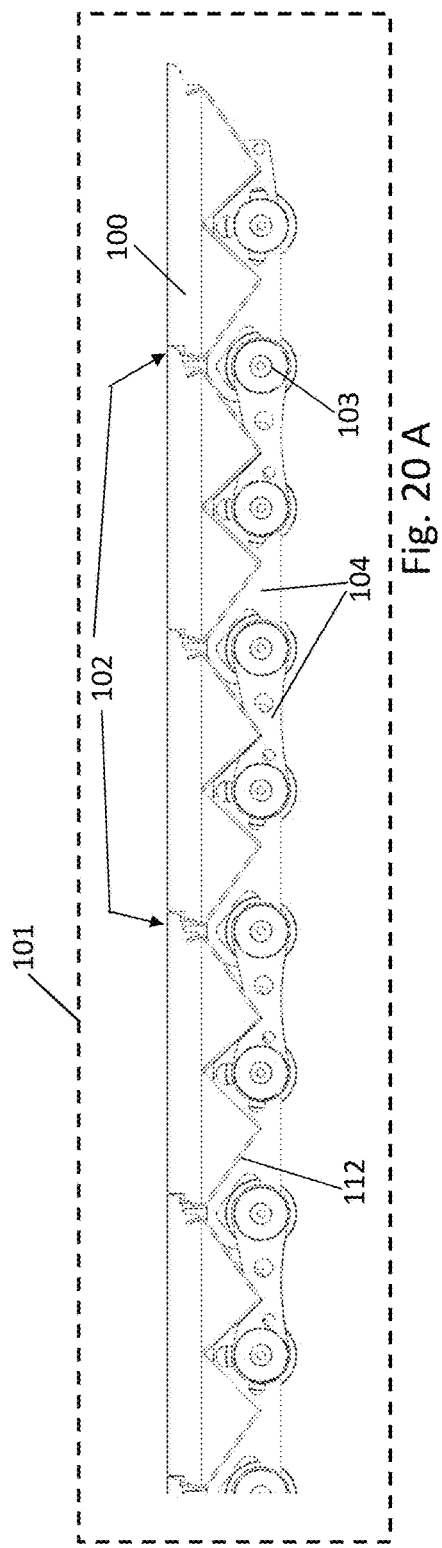
FIGS. 20 A and 20 B are sketches of the movable weight carrying support deck from an essentially side and side/ angled view.
Figure 20:
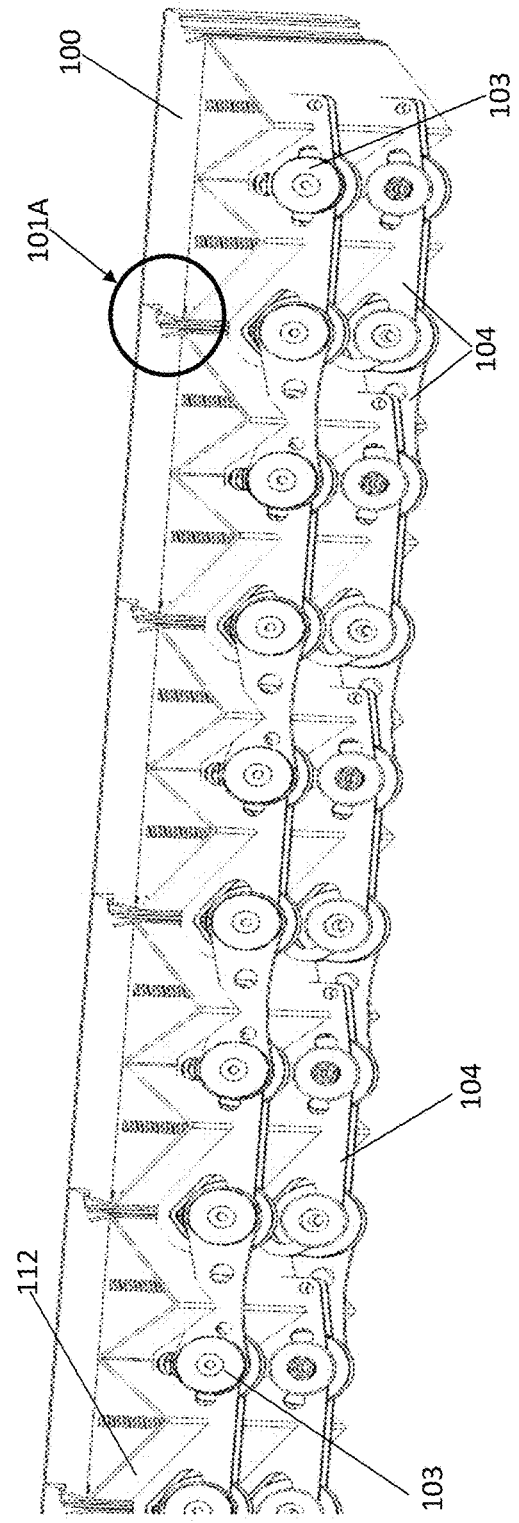

FIGS. 20 A and 20 B are sketches of the multiple tray set 102 from an essentially side and side/angled view. In these views, one can see a normal side view and slight angular view of the interlocking belt support trays 100. This shows the tray rollers and bearings 103 and the tray chain link 104 all together as one deck 101. Notice the chain link support deck 101 is configured such that the stepped-interconnection 101A actually becomes the structural component of multiple trays 102 that carries the trays 100 and transfers the weight (on the trays) onto the bearing 103. Thus the chain links 104 in the chain are designed as part of the trays 100 so the weight carrying support deck 101 with the chain link 104 acts as a "beam". When the support deck 101 straightens out and flattens, the support deck 101 carries the weight onto the bearings 103 from all of the dewatering process onto the whole chain. Thus, it transfers the weight of the chain 104, trays 100, bottom/lower belt 31 and all the slurry 85 and cake/paste products 88 onto the bearings 103. When one observes the side view of the tray 100, it may be noted that the series of trays are off set 101A and interlock with the next tray. Also noted is that every link 104 actually supports the tray 100. In this manner, the front of the second tray supports the back of the first tray, and so on for the series of trays. One notes the W-shape of the tray support brackets 107 112. The shape and configuration of the tray support bracket 112 is designed such that there is supporting force or strength across the tray 100. The shape also helps to shed and keep the debris 85 out of the area. When water/liquid filtrates 86 are running through the tray they come down to a sharp point and they always wash away clear. There is little or no chance of any residual debris 85 build up. If the tray support bracket 112 were flat, some of those areas might permit a situation where debris 85 would build up and slowly block off or even allow a big lump of debris 85 to form or collect over time. One also may notice how the trays lock together and the lead of the second tray is slightly behind the center of the supporting bearing 103. This means as the forward tray 100 comes up underneath it doesn't come down directly down but rather it comes up underneath the following tray. The offset fits into the following tray and then seals off to the trays. This makes for a rigorous and very tight interface at this junction. There also exist in that interconnect recess where the trays join a set of holes that actually go out through the bottom as well. This means if any water/liquid 86 does get into that interconnect area it drains back out into the tray itself. So theoretically the whole area underneath the tray is completely dry and sealed off.

FIGS. 21 A and 21 B are sketches of the interlocking belt support trays 100 and details shown from a top view. These sketches show the top plastic trays 100 made of an HDP Plastic or equal. The top of the tray have been designed for maximum drainage from moisture pulled from the lower belt membrane 32. These areas have been designed or machined out. All of the trays 100 are contiguous and touching together. The configuration is manufactured so there is maximum drainage. Where the belt membrane touches the tray, the top of the tray protrudes 105 up so there is essentially or approximately ½ (half) millimeter (MM) or about 20 thousandths of an inch that the belt membrane 32 is touching the tray 100. Then all the underneath is just free draining. As the membrane 32 and movable weight carrying support deck 101 enters of the vacuum chamber 40, water/liquid filtrate 86 comes through the slurry 85 and goes through those holes in the belt membrane and onto the trays 100. Those belt holes are small holes that helps adjust and control the amount flow that actually comes through from the belt membrane. There are is two belt holes per slot. Another reason for the hole and slot configuration is that it is critical for whole size for some of the products that are really binding because if the belt holes and slots create a tube effect, what can happen is that water/liquid 86 drains too quickly and the belt binds up with carried filtrate very quickly. Conventional type belts and the rubber type belts normally are configured just with a long slot and the water filtrate has to go down along the slot and then out the vacuum hole. This is acts just as an open tube to all the holes and opens very, very quickly. Then one can extract a large amount of water out very quickly. The tray interconnects 101A also basically lock with the chain for movement with the belt 31. The way in which the trays 100 interconnect 101A is designed so that the deck 101 is now complete and sealed. The water filtrate 86 from the slurry 85 runs through those holes down into the tray 100 and out sideways and into the vacuum chamber 40, thus area missing all the mechanical components.

Figure 22:
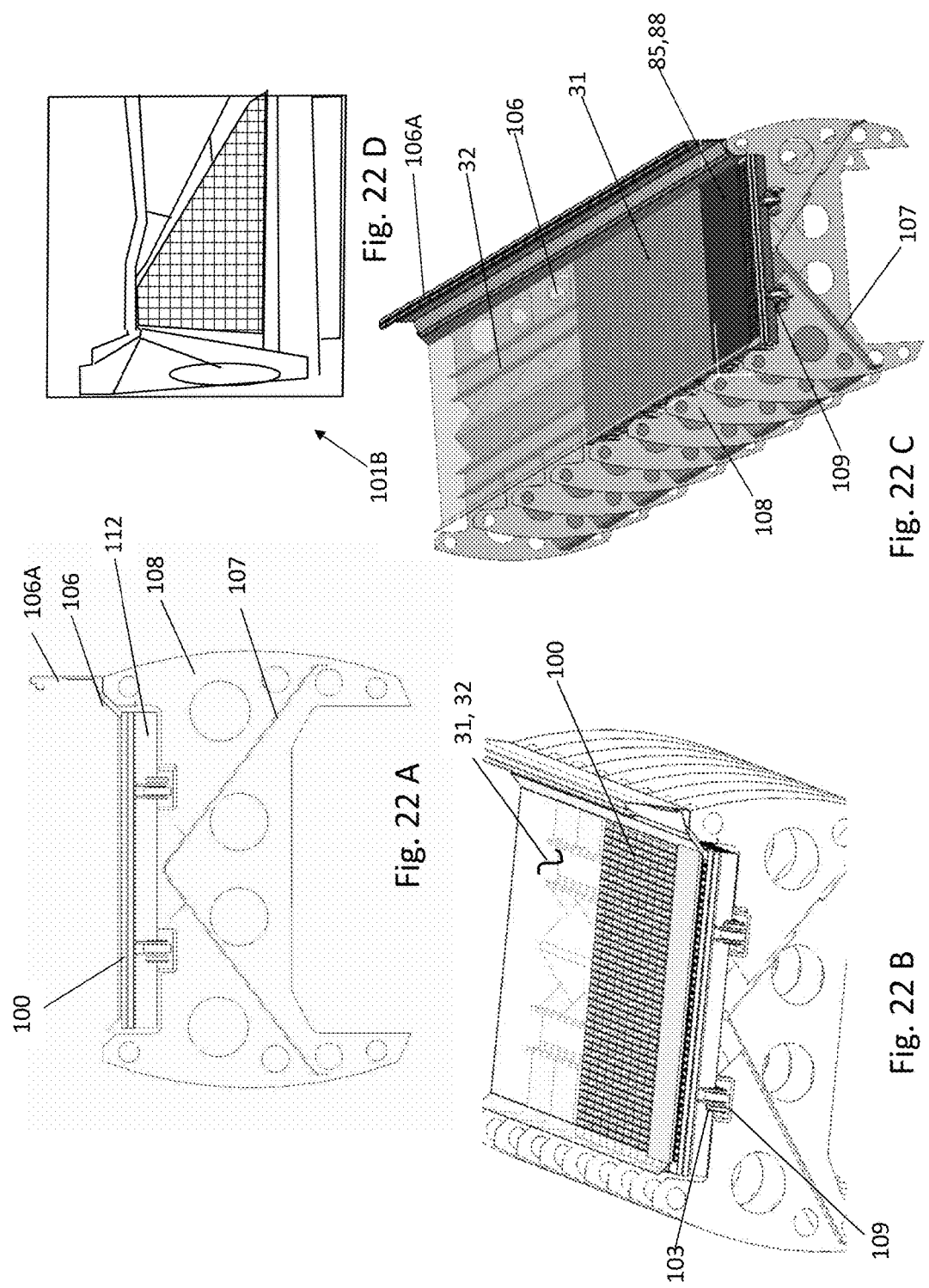
FIGS. 22 A through 22 D are sketches of a tray set with components shown and described.

FIGS. 22 A through 22 D are sketches of a set with components shown and described. These next sketches show another cross section of the movable weight carrying support deck 101 and belt 31, 32 combination. One sees there is a little bit of material 85,88 that represents the debris 85 and paste/wet cake 88. The clearer material is the membrane 32 of the bottom/lower belt 31. The side strips 106 are the sealing area. They run along the side of the machine just above the deck 101. The belt 31 slides against these strips 106 but is functionally supported by the deck 101. A full cross section shows the debris 85 and cake 88 are sitting on the belt 31 and how it is all supported by the deck 101. And the water/liquid 86 running down the holes moves into the tray and out sideways with the 112 and frame and then away from all of the mechanicals. Once diverted, the water travels to the bottom tray and then running downward to the lower end of the machine to be pumped out. This deck 101 can take an enormous amount of weight. It is sealed between the trays and the atmosphere by the belt membrane 32 and the debris 85 and cake 88 that pre-coats and then goes on to actually start blind the air off so the vacuum can continue to build up and be held at a high level. As the paste 88 and addition of the treated product is placed onto the belt 31, there comes a point where no more product will actually go through and blind the bottom/lower belt membrane 32 holes. At this point there has been created a mechanical seal that actually brings the vacuum and the unit up to a very high state of vacuum (approximately 27+/− inches of Hg.). This is then held at that state with very little required power on the vacuum system. Empirically this dewatering system has used just a 20 hp liquid ring pump and a maximum of 27 inches of Vacuum, so it is dependent on how one gets this flat part of the deck loaded with material as to how well the vacuum seal is going to work. For materials like sand and very grainy debris, one finds the air requirement will be more. Here it may be advised to not use a simple vacuum watering pump but switch to a centrifugal pump instead. Then one may also be using much lower vacuum level somewhere down at the level of probably about 10 to 12 inches of mercury. The sketches here of this area show that water drains as the material is supported by the deck trays. This tray area is very important as it supports all the weight from the vacuum chamber action.

Figure 23:
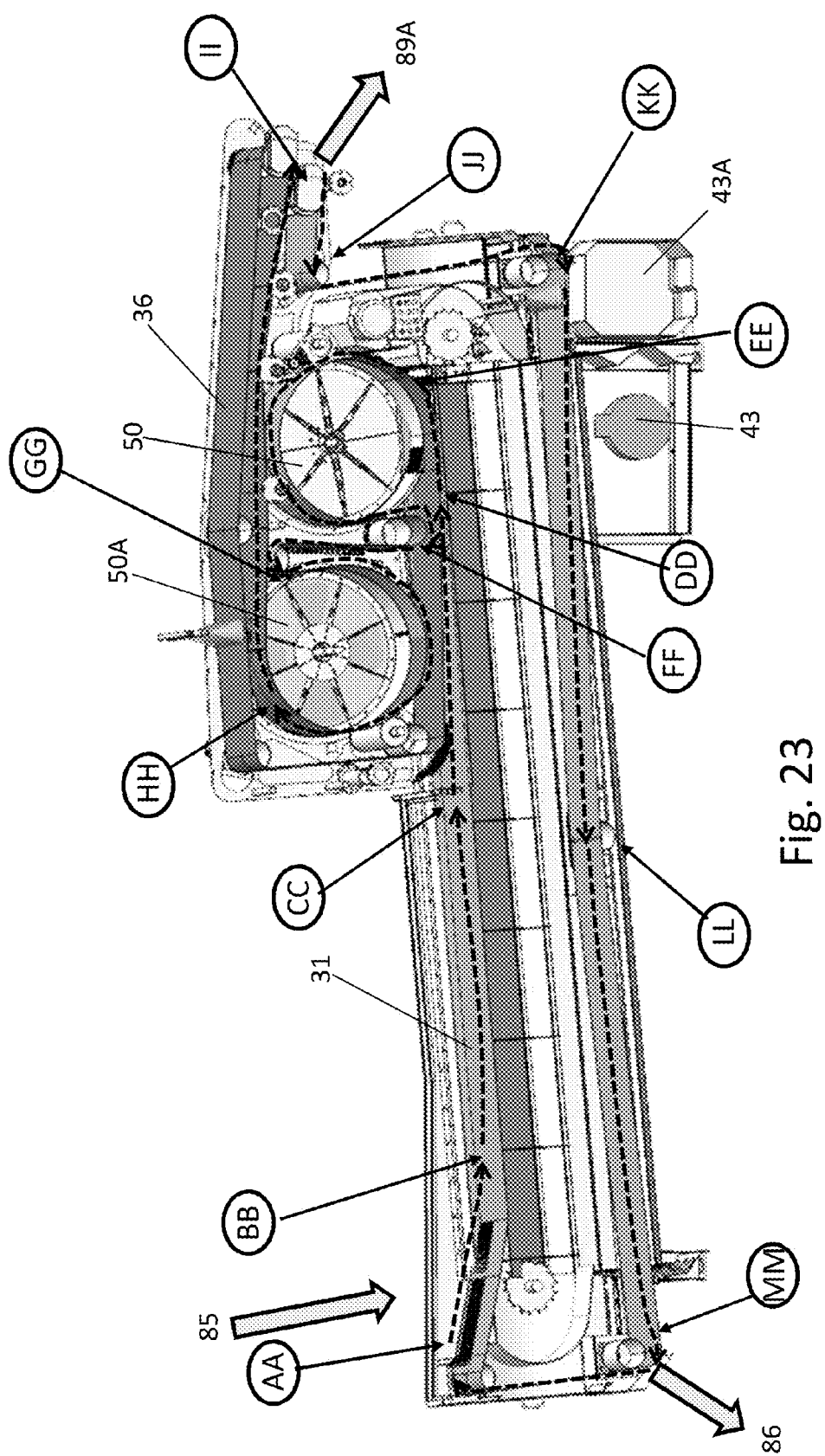
FIG. 23 is a sketch of the cross section for the special dewatering machine called ecoFlex, with a vacuum and belt combination with the sketch showing the special points around the machine and the operation flow for the lower belt and waste product as it moves through the machine.

FIG. 23 is described below in the operation section.

The details mentioned here are exemplary and not limiting. Other specific components and manners specific to describing a special dewatering machine called ecoFlex 30 product and process may be added as a person having ordinary skill in the field of devices for dewatering slurries well appreciates.

The special dewatering machine 30 called ecoFlex has been described in the above embodiment. The manner of how the device operates is described below. One notes well that the description above and the operation described here must be taken together to fully illustrate the concept of the machine 30. The preferred embodiment of the special dewatering machine 30 called ecoFlex is comprised of: a. a bottom material handling belt 31 with features and supported by a movable weight carrying support deck 101 on a specific path within the machine 30; b. a top material handling belt 36 with features and on a specific path within the machine 30; c. an intersection point of the bottom and top belt Point DD; d. at least one drum 50 which is part of the machine path; e. a means to move the top and bottom/lower belts trough the machine 60 et al; f. a set of at least one each means 34 to continuously keep the bottom and top belt in tension; g. a vacuum system 43 connected with the belt system and the at least one drum 50; h. a scraper means 35 to remove a cake 88 from the top 36 and bottom 31 belts; i. a cleaning means 91 for the top and bottom belt; j. a means to divert the wastewater to a collection system 92; and k. a return means and directional control 39 for the lower belt wherein a slurry 85 of suspended solids, fiber and liquid 86 may be loaded onto the belt and be processed with the belts 31,36 compression and vacuum chambers 40 along the conveyor and through the at least one large drums 50, in order to remove and separate the liquid 86 from the solids 87 and result in a dewatered, nearly dry cake 89 material for further treatment or disposal.

When combined with the ecoFlex system, a novel and efficient vacuum belt press offering extremely high flow capacities in a small footprint, the combined system creates a single source solution for liquid waste separation along with concurrent pathogen destruction. These benefits offer substantial cost savings and promise to create new opportunities for the beneficial reuse of a number of large volume wastes.

Many uses are anticipated for the special dewatering machine called ecoFlex 30. Some examples, and not limitations, are shown in the following Table.

| ITEM | DESCRIPTION |
| --- | --- |
| 1 | fibrous organic waste such as municipal wastewater sewage sludge; |
| 2 | industrial wastes as fibrous and liquid mixtures; |
| 3 | animal wastes associated with farming, concentrated animal feeding operations (CAFOs), and other agricultural uses; |

-continued

| ITEM | DESCRIPTION |
| --- | --- |
| 4 | coal, waste coal and coal fine recovery sites; |
| 5 | biomass energy products such as corn ethanol plants; |
| 6 | distilleries and breweries; and |
| 7 | other industrial markets. |

FIG. 23 is a sketch of the cross section for the special dewatering machine called ecoFlex, with a vacuum and belt combination with the sketch showing the special points around the machine and the operation flow for the lower belt and waste product as it moves through the machine.

| Point AA | Initial In-feed Of Material |
| --- | --- |
| Point BB | Transition Into Vacuum Zone |
| Point CC | Scrape Ahead of Vacuum Drums |
| Point DD | Top Belt Intersection with Lower Belt and Cake where the bottom and top material handling belts closely pass each other and are quasi contiguous |
| Point EE | Upward Turn of Belts and Cake Around Initial Vacuum Drum Full Dewatering Assembly |
| Point FF | Initial Reverse Roller at 8:00 off $1^{st}$ Drum to Upward Vertical |
| Point GG | Transition to Next ($2^{nd}$) Drum |
| Point HH | Top of $2^{nd}$ Drum Transition Off |
| Point II | Exit/Cake Scrapers and Out Feed |
| Point JJ | Sophisticated Parallel Belt Tensioners |
| Point KK | Lower Turn Into Belt Washers |
| Point LL | MID Machine Belt Tracker |
| Point MM | Last Roller Vertical TO Beginning |

FIGS. 6 A through 6 C are sketches of the final assembly 30A as a sectioned view essentially half-way down through the center of the entire machine 30—with components and features shown. As noted, this assembly 30A has been sectioned half-way down thru the center of the entire machine 30. One may notice the bottom/lower belt 31 is slightly wider. This is to enable one to demonstrate how the track progresses through the different stages. Starting at the left hand side (Point AA) is where the slurry 85 of waste material enters the machine 30 (in-feed 80 of the [waste] product/slurry 85 to be treated and dewatered). Here at the top left end of the belt 31 (coming off of the first roller 33) and the tray chain 104 off the driven sprocket 66 is the area where it just slopes down slightly. This creates a small water area at a level 88 (shown and described below). As the slurry 85 comes onto the lower belt 31, the water/liquid 86 and solids 87 first start to separate and this is where the solids 87 start to pre-coat 84 the bottom/lower belt 31. The excess water/liquid 86 travels "backward" in a "puddle" and some initially overflows to the drain pipe 92 below. This initial area is not yet entered the lower chamber and therefore is not under vacuum. One may see that just after the end roller 33 before entering the in feed area 80, there is a flap 81 or means for pushing the solids 87 onto the top of the lower belt 31. Here strip of plastic/rubber 81 above the belt 31 is forcing the material down. Next the slurry material 85 is just leaving the water puddle and comes through and holding product 85 down onto the bottom/lower belt 31. The bottom/lower belt 31 and vacuum chamber 40 combination are not yet actually "sucking" at this stage.

As the waste slurry 85 goes down into the next stage, now the vacuum of the lower chamber 40 begins to come on and act gently. In this area (Point BB) and then the area beyond, the vacuum between the chamber 40 and the weight of the paste material 88 is used to hold the bottom/lower belt 31 down against the weight carrying support deck 101. One may see the vacuum action from the paste 88 because as one can see if the lower belt 31 is pulled tight (fully tensioned) the bottom/lower belt 31 would not necessarily seal down on the bottom support trays surface 100A as it required/designed. As the vacuum from chamber 40 comes on gently to the bottom/lower belt 31, the water removal and stirring of the slurry 85 are causing a "paste or wet cake" 88 to build up on the top surface of the bottom/lower belt 31. This action of the paste 88 forming and the paste being spread with the scraper 35A is very important because it actually pre-coats 84 the bottom/lower belt 31. This pre-coat 35A provides the dewatering machine the ability to actually get a much thicker cake 88 forming "early-on" (early in the dewatering process and continuing with the material travelling on the bottom/lower belt 31). After moving beyond Point BB, into this second area where the vacuum is starting to come on, the bottom/lower belt 31 begins a slight rise upward with the angle of travel. From here on to the vacuum drums 50, 50A, there is a full vacuum and the bottom/lower belt 31 is fully supported by the movable weight carrying support deck 101. The movable weight carrying support deck 101 supports the lower belt membrane 32 and the membranes support the cake 88 or slurry/debris 85 that is on the top surface of the bottom/lower belt 31. As the cake/debris 88/85 continues to progress toward the drums 50, 50A, the vacuum from the lower vacuum chamber 40 continues pulling the water/liquid 86 out of the debris/cake 85/88 through the bottom/lower belt 31 and removing/dewatering the paste/cake 88 of the debris/slurry 85. As one follows the bottom/lower belt 31 up the slight incline, one will encounter a vacuum drum 50 at the length of the incline. Just a little prior to the drum 50, a paste scraper/wiper 35A provides additional movement to the paste/cake 88. As the cake dries, cracks form and permit air ways to form and "break" the vacuum. The paste scraper/wiper 35A (Point CC) helps prevent that formation of airways/vacuum breakers. Additionally, the paste scraper/wiper 35A will "burst" or break water pockets in the paste 88 and permit more liquid/water 86 to be "sucked" into the vacuum chamber and thus further dewater the slurry 85/paste/cake 88 and provide more moisture/water 86 removal.

As one can see after the scrape/wiper 35A in Point CC, there is a second top belt 36 that engages the cake 88 material (Point DD). Here the second top belt 36 is designed to hold the cake 88 product while it going around the vacuum drums 50, 50A. At the point where the cake 88 is trapped between the second top belt 36 and the bottom/lower belt 31, the two belts (bottom/lower and top material handling belts closely pass each other and are quasi contiguous) 31,36 turn upward (Point EE) and follow around the initial vacuum drum 50. Here the caked [waste] product 88 is actually turned upside down and sucked from the top side though the top belt 36 and into the initial vacuum drum 50. So as the cake material was coming out the slope on the lower belt 31 and being pulled by the chamber 40 below, the transition seal 56 (explained elsewhere herein) now has the cake 88 being pulled in an opposite fashion since there is a little bit of cake 88 that stores some moisture 86 up on top. One sees that at around the rear position of the initial vacuum drum 50 at about the two o'clock (2:00) position, there is another roller which is the first crush/press roller 38. This roller 38 is designed to do is give the cake 88 product a bit of a squash to break the cells of liquid/water 86 and airways from cracks to again permit the vacuum to seal by the moisturized paste 88. The belts 31,36 and material 88 keep coming around the initial vacuum drum 50 as far as possible to get the maximum wrap 37 of the belts 31,36 around the vacuum drum 50. There is a vacuum roller transition seal 56 (described elsewhere herein) that maintains the vacuum seal as the belts 31,36 transition away from the initial vacuum drum 50. The transition 56 sealing the product 88 between the belts 31,36 now is sealing the vacuum from getting into that drum 50 giving it a higher vacuum because the cake 88 won't let any air go through belt/cake combination. This doesn't require much power since the vacuum is maintained and the vacuum pump 43 need not supplement a loss of vacuum.

Next, at about eight o'clock (8:00) position on the initial drum (Point FF) both of the belts 31,36 go around the bottom roller 33 and then go vertical. Here the bottom roller 33 actually moves the product 88 slightly. This Point FF is the first big radius change that the cake 88 product has encountered. The radiused change just moves the material slightly because there are two belts 31,36 going at slightly different speeds. If the paste/cake 88 is binding up, losing liquid/water 86 flow, creating air tracks, etc. this gives the cake/paste 88 new water tracks and new air tracks around the top belt 36 and then seals on to the second vacuum drum 50A. The belts 31,36 and cake 88 material continue essentially vertically and transition around another belt roller 33 and onto the second drum (Point GG). Again, there is another vacuum transition seal 56 (described elsewhere herein) that maintains the vacuum seal as the belts 31,36 transition away from the top roller and onto the second vacuum drum 50A. This second vacuum drum 50A is taking the liquid/water 86 out of the original side of the paste 88. The belts 31,36 and cake 88 go around the drop there is another crush/press roller 38 around 8:00 position. That crush roller 38 again just moves the product 88 slightly and takes the blinding off the cake 88 and also breaks a few more of the liquid/water 86 cells to introduce the last little bit of liquid/water 86 that is still in the product 88. It comes around the second vacuum drum 50A and the transition seal 56 keeps the vacuum in the second drum 50A.

At the top vacuum roller seal (Point HH), the belts 31,36 then move to the right hand end (Point II) where the material scrapers 35 are mounted. As those scrapers 35 engage with the dry cake 89 and scrape off the cake 89 (normally if the cake product is dry enough it will just fall off) both the top 36 and lower 31 belts return back through rollers 33 and sophisticated tensioners 34,34A (Point JJ) which govern the tension on the belts 31, 36. The sophisticated tensioners 34, 34A are ones pulled and moved in two side slots to provide tension and those two sides/arms are timed. If wet or dry cake 88,89 product builds up on one side of the belt 31,36 the whole roller 33 moves parallel in the tensioner 34,34A. This is important because if the roller 33 doesn't move parallel and is independent the belt 31 or 36 will start tracking off sideways very quickly and then one cannot control it. On one end of each tensioner 34,34A are roller bearings that are all adjustable. Each Roller 33 can be separately adjusted to get it absolutely "spot on" and parallel so it enhances the belt tracking. The adjustment comes down to the bottom roller where the belt moves around that roller 33 into belt washer 91 area (Point KK).

The belt spray washer area 91 is up at the front end (out feed 89A end of the machine 30), Point KK, so that all excess wash liquid/water 86 runs down the channel 70 type and that means the channel 70 is self-cleaning. No waste product 88, 89 builds up in those channel 70 areas because they are smooth and run down the full distance of the machine 30.

Next the bottom/lower belt 31 continues down to the next roller 33 in the middle of the machine (Point LL). Here one finds a tracking roller mechanism 39. This tracking roller mechanism 39 is absolutely vital because it pulls the control roller from one side forward or backwards which then in turn puts an angle on the roller to the bottom/lower belt 31. This angle pushes the bottom/lower belt 31 one way or the other way. If the tracking roller mechanism 39 is centered on the bottom/lower belt 31 and square to the belt 31, then the lower belt 31 would be just running true and with no tracking on the roller. As soon as one moves the tracking roller backwards or forwards, this puts an angle on the belt 31 and moves the belt one way or the other. After the tracking roller mechanism 39, the belt 31 will follow that line down to the last belt roller 33 (Point MM) and then that takes it back up to start the process over again (Point AA) at the in-feed 80 of the machine 30. At point AA, there is a guard with the little piece of rubber 81 on it so even if that water puddle area described above overflows the will only overflow into the water pipe and take the excess water back into a sump. This means one may run the machine 30 in an overflow mode all the time to make sure to get a maximum amount of slurry and flow on to the in-feed and lower belt.

As for the top belt 36 if one starts at the center of the machine 30 and follows the travel to the right, the top belt 36 slopes down so the top belt 36 is going to put a crush onto the bottom/lower belt 31 just as the both touch and converge (Point EE). This area where the belts 31,36 meet is quite an important area. There is an end seal 110 on the back of the top belt 36 and an end seal 110 on the back of the bottom/lower belt 31. At this back of the two belt intersection (Point EE) there are also side seal members 111 which actually seal on the sides and which actually seal the first drive roller to the bottom of the deck 101. This seal is absolutely important and this is one of the hardest vacuum seals to accomplish. This is because the drive roller is rotating yet it must seal the vacuum while still being a very low friction resisting the belt movement. This intersection is seen in other drawings (Ref FIG. 13). The low friction seal is accomplished with plastics that are quite efficient. They are high efficiency matches of the surfaces with a stainless steel. By using a little bit of pressure on the water flowing, this keeps the side seals and the other seals discussed above efficient and explains why a little bit water leaks and gives the interface of the sea and belt a little better lubrication. From the back there is a little interference seal on the back of the bottom/lower belt 31 from the center of where it comes off the tray. That means the belt comes off the deck 101 very easily because there is a nice neutral area and the cake product is bound from both sides (top 36 and bottom/lower 31 belts) and it will release from one belt and then re-engage again with the other belt when it goes back on the vacuum drum 50 and the dewatering will continue. The bottom/lower belt 31 edges follow the second top belt 36 around trapping the debris 85 material as the cake 88 in between those two belts 31,36. This differs from traditional dewatering machines because when the cake starts to dry out on a traditional machine the cake starts cracking and one will have to spray water on the dryness of the belt. This newly invented dewatering machine 30 holds the cake 88 in one place, squeezes it in that place, creates a paste seal 88 to maintain the vacuum, and seals a nice and uniform cake or paste 88 across the roller. Therefore, there is no loss of any vacuum or anything like that.

Further, the two vacuum drums 50,50A supplement the vacuum dewatering along the length of the belt. This gives the paste/cake material a lot of time under pressure. Since dewatering a material is all about pressure over time this machine dewaters with a very, very small foot print and length of the belt that actually runs the product under pressure.

With this description it is to be understood that the special dewatering machine called ecoFlex 30 is not to be limited to only the disclosed embodiment of product. The features of the special dewatering machine called ecoFlex device and process 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless they are defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other of the embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless they are otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A vacuum assisted dewatering machine for removing water from a slurry, the vacuum assisted dewatering machine is comprised of:
   a. a bottom material handling belt (31) with an open surface configuration and fully supported across the width and length by a movable weight carrying support deck on an initial slurry loading path within the dewatering machine;
   b. a top material handling belt (36) with an open surface configuration and supported across the width by an at least one vacuum assisted drum with an internal vacuum connection on a vacuum section of a specific path within the dewatering machine;
   c. an intersection point (D-D) where the bottom material handling belt (31) and the top material handling belt (36) closely pass each other; where the belts loop around the at least one vacuum assisted drum with the internal vacuum connection; where the belts are quasi contiguous; and where the belts encompass the slurry between the belts;
   d. the at least one vacuum assisted drum with an internal vacuum connection comprised with a plurality of apertures (52) which is the section of the specific paths of both of the bottom material handling belt (31) and top material handling belt (36) of the dewatering machine and a direct connection to a vacuum system;
   e. an electric motor and a gearbox for moving each of the top and bottom material handling belts through the dewatering machine;
   f. a belt tensioner with a set of two side slots and a roller in parallel to the belts and between the two side slots for keeping the bottom and top belt aligned and constantly in tension;
   g. an at least one vacuum system connected with an enclosure of the top and bottom material handling belts and connected with the at least one vacuum assisted drum comprised with a plurality of apertures (52);
   h. a scraper means for removing a dryer slurry cake from the top and bottom material handling belts;
   i. a plurality of high pressure water sprayers for cleaning each of the top and bottom material handling belt;
   j. a lower return tray/pan for diverting a quantity of wastewater to a collection system and for protecting the movable weight-carrying support deck from the slurry; and
   k. a belt tracking roller mechanism for returning and for directional controlling the bottom material handling belt wherein a slurry composed of a mixture of suspended solids, fiber and liquid may be loaded onto the bottom belt and be processed with the top and bottom material handling belts compression and the at least one vacuum chamber along the top (36) and bottom (31) material handling belts and through large drums in order to remove and separate the liquid from the solids and fiber in the mixture and result in a dewatered, nearly dry cake material for further treatment or disposal.

2. The dewatering machine as in claim 1 wherein the at least one vacuum assisted drum with an internal vacuum connection comprised with a plurality of apertures are two essentially equally sized vacuum assisted drums each drum with an internal vacuum connection comprised with a plurality of apertures.

3. The dewatering machine as in claim 1 wherein the at least one vacuum assisted drum with an internal vacuum connection comprised with a plurality of apertures are at least three vacuum assisted drums each drum with an internal vacuum connection comprised with a plurality of apertures.

4. The dewatering machine as in claim 1 wherein the movable weight carrying support deck is comprised of a a series of interlocking belt support trays (100), a series of rollers and bearings (103), a series of tray support W-brackets(112), and a series of tray chain links (104)wherein the movable weight carrying support deck is further supported by a pair of channels (109) which rest on a series of gussets (108)and inverted vee-plates (107)and is contiguous to and supports a membrane (32) of the bottom material handling belt (31) whereby the bottom material handling belt (31) supports the cake (88) and slurry (85) that is on a top surface of the bottom material handling belt (31).

5. The dewatering machine as in claim 4 wherein the interlocking belt support trays (100) are a series of trays wherein each tray is offset and interlocks with the next tray and wherein a front of a second tray supports a back of a first tray, and so on with the series.

6. The dewatering machine as in claim 1 wherein the at least one vacuum system connected with an enclosure of the top and bottom material handling belts and with the at least one vacuum assisted drum with an internal vacuum connection comprised with a plurality of apertures is a separate vacuum system for each of the bottom material handling belt, the top material handling belt, and the at least one vacuum assisted drum with an internal vacuum connection.

7. The dewatering machine as in claim 6 wherein the at least one vacuum assisted drum with an internal vacuum connection are two essentially equally sized vacuum assisted drums each with an internal vacuum connection and the at least one vacuum system connected with an enclosure of the top and bottom material handling belts and with the at least one vacuum assisted drum with an internal vacuum connection is a separate vacuum system for each of the bottom material handling belt, the top material handling belt, and each of the two vacuum assisted drums each with an internal vacuum connection comprised with a plurality of apertures.

8. The dewatering machine as in claim 7 wherein the intersection point where the bottom and top material handling belts closely pass each other and are quasi contiguous are further comprised of a series of vacuum assisted drum transition seal assembly (56) made with a series of tapered/comb-like fingers (57).

9. The dewatering machine as in claim 8 wherein the vacuum assisted drum transition seal assembly (56) made with the series of tapered/comb-like fingers (57) made of a material that is selected from the group consisting of nylon plastic; stainless steel; and composite material.

* * * * *